United States Patent
Jain

(10) Patent No.: US 12,056,448 B2
(45) Date of Patent: Aug. 6, 2024

(54) SYSTEMS AND METHODS FOR PROACTIVELY EXTRACTING DATA FROM COMPLEX DOCUMENTS

(71) Applicant: Capital One Services, LLC, McLean, VA (US)

(72) Inventor: Indu Jain, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 374 days.

(21) Appl. No.: 17/443,642

(22) Filed: Jul. 27, 2021

(65) Prior Publication Data

US 2023/0034344 A1 Feb. 2, 2023

(51) Int. Cl.
G06F 40/186 (2020.01)
G06F 21/60 (2013.01)
G06F 40/216 (2020.01)
G06F 40/30 (2020.01)
G06N 3/04 (2023.01)

(52) U.S. Cl.
CPC .......... *G06F 40/186* (2020.01); *G06F 21/60* (2013.01); *G06F 40/216* (2020.01); *G06F 40/30* (2020.01); *G06N 3/04* (2013.01)

(58) Field of Classification Search
None
See application file for complete search history.

(56) References Cited

U.S. PATENT DOCUMENTS

| | | | |
|---|---|---|---|
| 10,331,950 B1 * | 6/2019 | Suriyanarayanan | ............ G06V 30/416 |
| 10,592,310 B2 | 3/2020 | Li et al. | |
| 10,635,751 B1 * | 4/2020 | Relangi | ............ G06F 40/35 |
| 10,929,759 B2 | 2/2021 | Shinn et al. | |
| 11,715,465 B2 * | 8/2023 | Ahmadidaneshashtiani | ............ H04L 51/02 704/257 |
| 2017/0017635 A1 | 1/2017 | Leliwa et al. | |
| 2018/0032497 A1 * | 2/2018 | Mukherjee | ............ G06V 30/416 |
| 2018/0131645 A1 | 5/2018 | Magliozzi et al. | |
| 2018/0150913 A1 * | 5/2018 | Wang | ............ H04L 67/306 |
| 2018/0239959 A1 | 8/2018 | Bui et al. | |
| 2018/0285595 A1 | 10/2018 | Jessen | |
| 2019/0156222 A1 | 5/2019 | Emma et al. | |
| 2019/0251182 A1 | 8/2019 | Ray et al. | |

(Continued)

*Primary Examiner* — Jesse S Pullias

(74) *Attorney, Agent, or Firm* — TROUTMANT PEPPER HAMILTON SANDERS LLP; Christopher J. Forstner; John A. Morrissett

(57) ABSTRACT

A system for proactively extracting data from complex documents is disclosed. The system may include one or more processors, an NLP device, a trained machine learning device, and a memory in communication with the one or more processors and storing instructions that, when executed by the one or more processors, are configured to cause the system to, receive one or more documents from a client device, extract one or more extractable data entries from the one or more data entries, generate, one or more normalized data entries, and proactively generate and add one or more completed data entries in place of one or more placeholders in a first document template. The system may receive a natural language prompt from a user device and determine a machine-readable semantic representation. The system may identify sensitive data entries and generate a graphical user interface identifying completed data entries and associated confidence intervals.

18 Claims, 7 Drawing Sheets

(56) References Cited

U.S. PATENT DOCUMENTS

| | | |
|---|---|---|
| 2019/0347668 A1 | 11/2019 | Williams et al. |
| 2020/0068031 A1* | 2/2020 | Kursun ................. H04W 24/02 |
| 2020/0183995 A1 | 6/2020 | Hassanzadeh et al. |
| 2020/0218797 A1* | 7/2020 | Lucic .................... G06F 16/958 |
| 2020/0327622 A1 | 10/2020 | Podgorny et al. |
| 2022/0237567 A1* | 7/2022 | Tiwari ............... G06Q 10/1053 |

\* cited by examiner

SYSTEMS AND METHODS FOR PROACTIVELY EXTRACTING DATA FROM COMPLEX DOCUMENTS

FIELD

The disclosed technology relates to systems and methods for proactively extracting data from complex documents, and more particularly systems and methods for providing natural language responses to user generated questions regarding information extracted from complex documents.

BACKGROUND

Many businesses utilize customer service representatives and auditors to verify client information regarding applications for a product or service. For example, when a client of a business wishes to apply for a loan, refinance an existing loan, open a line of credit, etc., the client typically fills out and uploads a series of complex documents to a business through a web portal. At that point, customer service representatives and/or auditors may manually review the documents provided by the customer to extract and verify certain data entries necessary to either approve or deny the client's application for a product or service. However, such a manual review is both costly and inefficient for the businesses because they must devote significant human resources to the process, and the process is difficult to automate.

Accordingly, there is a need for systems and methods that can streamline the document review process by proactively extracting relevant data entries and filling out document templates associated with the client application for the product or service, and providing a natural language system allowing customer service representatives and/or auditors to verify information provided by clients using speech and/or text prompts to extract data entries from complex documents. Embodiments of the present disclosure are directed to this and other considerations.

SUMMARY

Disclosed herein are systems and methods for proactively extracting data from complex documents. Consistent with the disclosed embodiments, a natural language system for proactively extracting data from complex documents is provided. The system may include one or more processors, a Natural Language Processing (NLP) device, a trained machine learning device, and a memory in communication with the one or more processors storing instructions that, when executed by the one or more processors, cause the system to perform one or more steps of a method. The system may receive, from a client device, one or more documents and a first action request. The system may extract one or more extractable data entries from the one or more documents based on the first action request. The system may generate, by the NLP device, one or more normalized data entries based on the one or more extractable data entries. The system may proactively generate and add, by the trained machine learning device, one or more completed data entries in place of one or more placeholders in a first document template. The one or more completed data entries may be generated based on the normalized data entries and the first action request.

Consistent with the disclosed embodiments, a natural language system for secure data extraction from source documents is provided. The system may include one or more processors, a Natural Language Processing (NLP) device, a trained machine learning device, and a memory in communication with the one or more processors storing instructions that, when executed by the one or more processors, cause the system to perform one or more steps of a method. The system may receive, from a client device, one or more documents and a first action request. The system may extract one or more extractable data entries from the one or more documents based on the first action request. The system may generate, by the NLP device, one or more normalized data entries based on the one or more extractable data entries. The system may identify, by the trained machine learning device, one or more sensitive data entries within the one or more normalized data entries, each of the one or more sensitive data entries associated with a security tier of a plurality of security tiers. The system may receive, from a first user device, a first natural language prompt and a first security identifier associated with a first security tier of the plurality of security tiers. The system may determine, by the NLP device, a machine-readable semantic representation of the first natural language prompt. The system may provide, to the trained machine learning device, the machine-readable semantic representation of the first natural language prompt. The system may determine, by the trained machine learning device, a response to the machine-readable semantic representation of the first natural language prompt. The response may include at least one of the one or more normalized data entries and an associated confidence interval for each normalized data entry in the response. The system may alter the response, by the trained machine learning device, by omitting any sensitive data entry not associated with the first security tier. The system may provide the altered response to the first user device.

Consistent with the disclosed embodiments, a natural language system for secure data extraction from source documents is provided. The system may include one or more processors, a Natural Language Processing (NLP) device, a trained machine learning device, and a memory in communication with the one or more processors storing instructions that, when executed by the one or more processors, cause the system to perform one or more steps of a method. The system may receive, from a client device, one or more documents. The system may extract one or more extractable data entries from the one or more documents. The system may generate, by the NLP device, one or more normalized data entries based on the one or more extractable data entries. The system may receive, from a first user device, a first natural language prompt. The system may determine, by the NLP device, a machine-readable semantic representation of the first natural language prompt. The system may proactively determine, by the trained machine learning device (i) a first document template associated with the one or more normalized data entries and (ii) a first confidence interval based on the first natural language prompt. In response to the first confidence interval exceeding a predetermined threshold, the system may proactively generate and add, by the trained machine learning device, one or more completed data entries in place of one or more placeholders in the first document template, the one or more completed data entries being generated based on the normalized data entries. In response to the first confidence interval not exceeding the predetermined threshold, the system may generate, by the NLP device, a natural language response including a request for a first user associated with the first user device to verify the first document template and transmit the natural language response to the first user device.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
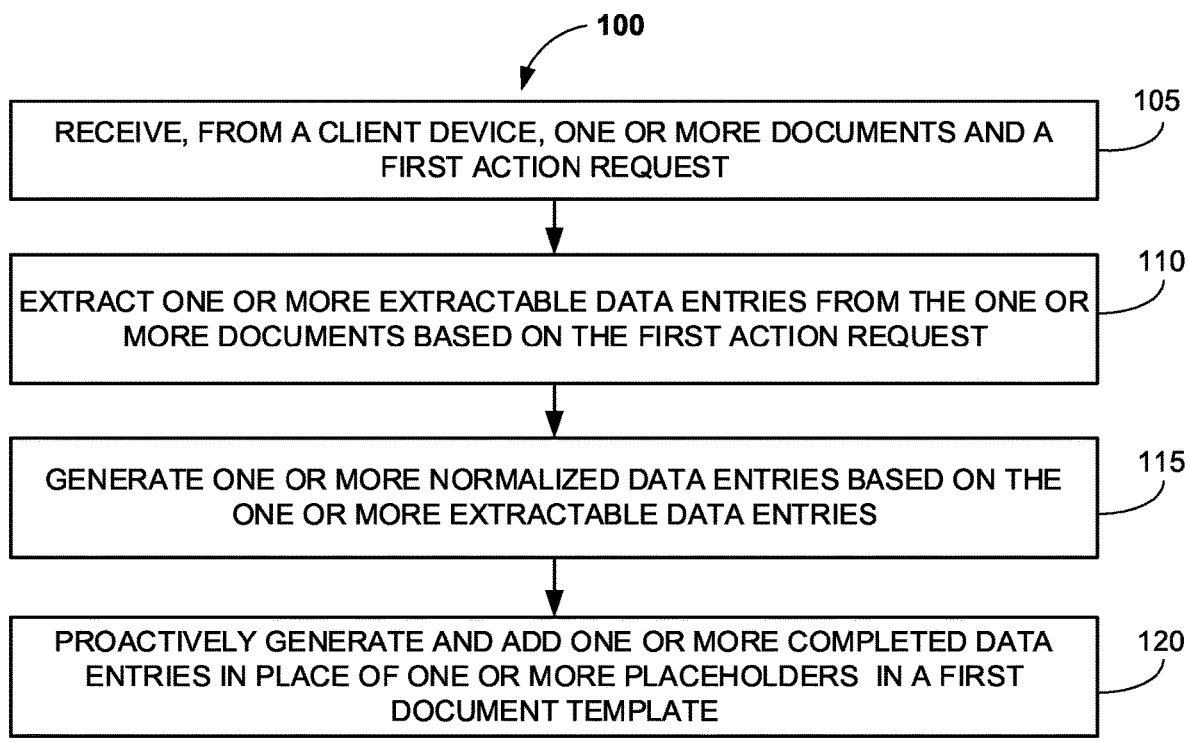
FIG. 1 is a flow diagram 100 illustrating examples of methods for proactively extracting data from complex documents, according to an example implementation of the disclosed technology.

According to certain example implementations of the disclosed technology, systems and methods are disclosed herein for proactively extracting data from complex documents and/or securely extracting data from source documents. For example, in one aspect, a system is provided. The system may be configured to autonomously receive and interpret user communications to determine whether the user communications include a prompt for one or more data entries extracted from one or more source documents provided to the system by a client device.

In some embodiments, the trained machine learning device may query and/or request data from one or more external sources in order to (i) determine an action request associated with a client, (ii) identify and/or extract one or more extractable data entries from one or more documents uploaded by a client device, and/or (iii) identify a document template associated with an action request and the one or more documents uploaded by the client device. Accordingly, the trained machine learning device may access one or more databases to retrieve details related to the client including, but not limited to, a client profile, client interaction history, etc. In some examples, the client interaction history may include a history of products or services the client has previously applied for, for example, a home refinance, an auto loan, an application for a bank account, an application for a credit account, etc.

In certain implementations, the trained machine learning device may utilize both rule-based methods and machine learning methods to perform the steps of methods consistent with the present disclosure. For example, the trained machine learning device may further retrieve rules from a rule-based platform that may be utilized to extract data entries from source documents received by the system. For example, the rule-based platform may include algorithmic rules developed based on case-based reasoning techniques, for example by extracting stored knowledge from previous client interactions. The rule-based platform may additionally include information related to, for example, rules related to identifying relevant extractable data entries from source documents received from clients that may be utilized for extracting data entries from source documents and proactively identifying and filling a document template associated with an action request from a client (e.g., the client is requesting an auto loan refinance and has uploaded a credit history statement, a paystub, and an appraisal of a vehicle for which the client is requesting refinancing, and the system determines a relevant template that must be completed with extractable data entries before the refinance is approved).

In certain implementations, the trained machine learning device may generate natural language to interact with a user and prompt the user for additional information related to identifying a document template and extract data entries from one or more documents. The trained machine learning device may prepare dialog modifying commands based on natural language prompts provided by a user, client profile information and/or client interaction history data available to the system, and/or associated rules from the rule-based platform. The trained machine learning device may use such dialog modifying commands to program a natural language processing (NLP) device to, for example, modify a response with details related to the user's communication (e.g., relevant extractable data entries). The dialog modifying commands, for example, may be utilized by the NLP device to generate/revise a natural language response that can include: a request for verification of certain details related to the user's communication, a confirmation of a detected assertion, a response including one or more relevant extractable data entries and an associated confidence interval for each extractable data entry, a request for additional information from the user regarding the perceived natural language prompt, etc. Such interactions may be carried out by the systems and methods disclosed herein without involving a human service agent. Accordingly, the trained machine learning device may program the NLP device and may use feedback received from the user to further revise or update the dialog modifying commands in an iterative manner. When the system extracts a one or more extractable data entries from one or more source documents, the trained machine learning device may identify a document template and a confidence interval associated with the identified document template and, if the document template has a confidence interval exceeding a predetermined threshold, may proactively generate and add, one or more data entries from source documents to the document template. If the document template has a confidence interval that does not exceed the predetermined threshold, the system may generate, using the NLP device, a natural language response including a request for a user to verify the first document template.

According to some embodiments, the NLP device may "interpret" natural language received from a user into a form that the trained machine learning device can understand. For example, the NLP device may determine machine-readable semantic representations from statements asserted by the user as well as questions posed by the user. For example, "Does the client's salary qualify the client for auto loan refinancing?" can reasonably be understood to imply that the user wants to verify the client's income is within an allowable range for the requesting auto loan refinance.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram 100 illustrating examples of methods for proactively extracting data from complex documents, according to an example implementation of the disclosed technology. In block 105, the system may receive, from a client device, one or more documents and a first action request. The first action request may include a request for an approval of a home loan application, an automotive loan approval, an approval for a credit card, an approval for an extension of credit, an approval for an automotive loan refinance, an approval for a mortgage refinance, etc. According to some embodiments, the first action request may be a request for approval of any lending product or service. The one or more documents may include information related to the first action request. For example, the client may upload documents related to the client's credit history as well as information identifying a vehicle, including the VIN, mileage, MSRP, included options, etc. as part of the one or more documents. Received documents may be uploaded to the system by a client device (e.g., via communication between client device 502A and one or more components of system 500, including via web server 510, API server 522, NLP device 524, and/or transaction server 512, described in more detail with respect to FIG. 5).

In block 110, the system (e.g., machine learning device 520) may extract one or more extractable data entries from the one or more documents. According to some embodiments, the one or more extractable data entries may be based in part on the first action request. For example, when the first action request is for an approval of an automotive loan, the system (e.g., machine learning device 520) may utilize technologies such as optical character recognition in order to parse the text of the one or more documents, and extract relevant data, such as a vehicle identification number (VIN) associated with a vehicle, a vehicle cost, a total requested loan amount, requested interest rate, etc. According to some embodiments, the system (e.g., machine learning device 520) may utilize one or more of a rule-based platform (e.g., rule-based platform 690) and/or machine learning model (e.g., machine learning model 695) to extract one or more extractable data entries from the one or more documents.

In block 115, the system may generate one or more normalized data entries based on the one or more extractable data entries. For example, if the extractable data entry 108 comprises a social security number ("SSN") in the form 123-45-7890, it may be normalized to 123457890 according to a business ruleset (e.g., rule-based platform 690). The rule-based platform may include standardization routines for commonly detected data types. For example, the rule-based platform may include instructions to remove all punctuation from an extracted phone number (e.g., (441)958-3321 would become 4419583321). As a further nonlimiting example, the rule-based platform may cause the system (e.g., machine learning device 520) to normalize an extractable data entry comprising a street address by formatting it to observe United States Postal Service (USPS) postal addressing standards. USPS postal addressing standards include standardized abbreviations for common street markers such as "Ave." for Avenue and "St." for Street. Accordingly, the business ruleset may format extractable data entries including postal addresses to observe these standards.

According to some embodiments, the system may identify and extract a data entry including a business name (e.g., Wally's Pawn Shop). The system may utilize one or more of a rule-based platform (e.g., rule-based platform 690) and/or a machine learning model (e.g., machine learning model 695) to convert the business name into a normalized street address. In some embodiments, the system may verify the generated address by querying one or more third party sources of data (e.g., third party server 526). In some embodiments, the system may identify and extract a data entry including a GPS coordinate. The system may standardize the GPS coordinate data entry by determining a corresponding in a similar manner as described above with respect to a business name.

According to some embodiments, the system may identify and extract a data entry including a VIN. Based on extracting a VIN, the system may normalize the extractable data entry by querying a third-party data source (e.g., third-party server 526) to determine additional information associated with the VIN. For example, the system may receive, based on the query to the third-party source, that the VIN is associated with a specific vehicle model, trim, color, package, etc. Each of the additional pieces of information may be added to the one or more extracted data entries corresponding to the one or more documents uploaded to the system.

According to some embodiments, one or more of the uploaded documents may come from a source other than a client (e.g., a source other than client device 502A). For example, one or more documents associated with a client may be received from a third party (e.g., via third party server 526). In some embodiments, the third-party (e.g., third party server 526) may identify and extract one or more data entries before transmitting the one or more documents to the system. The documents and/or extractable data entries received from the third-party source (e.g., third-party server 526) may be in a non-standard format, or otherwise in a different format than for the documents directly uploaded to the system. Accordingly, the system (e.g., machine learning device 520) may convert the documents and extractable data entries from the third-party source into a standardized format.

According to some embodiments, the normalization of one or more extractable data entries may further include querying a third-party (e.g., third-party server 526) to identify more data associated with a respective extractable data entry. For example, if the system identifies and extracts a data entry including a social security number, the system may query a third party source (e.g., third-party server 526) to identify previous loan information associated with the social security number. If the customer is requesting a modification or refinance of an existing loan product, the system may identify previous loan details based on querying the third-party data source using the extracted social security number.

In block 120, the system may proactively generate and add, one or more completed data entries in place of one or more placeholders in a first document template. For example, the system (e.g., machine learning device 520) may identify a document template based on the first action request and the one or more normalized data entries. The system may determine a correlation between each of the one or more normalized data entries and placeholder entries in a first document template allowing the system to proactively fill the first document template with one or more completed data entries in place of the placeholder entries. According to some embodiments, the one or more completed data entries may be based in part on the one or more normalized data entries. For example, when the first action request is a request for approval of an automotive loan, the system may extract a data entry for the client's SSN, telephone number, salary, previous loan applications, credit history, etc., normalize each extractable data entry to put it into a standardized format for entry into a document template, and identify that the relevant document template is one that includes data entries associated with an automotive loan approval. Accordingly, the system may without any input from a user or auditor (e.g., user of a user device 502B) proactively fill a relevant document template with one or more completed data entries to streamline the approval process for a client action request, such as a first action request. According to some embodiments, the system may also be configured to perform one or more of the following: (i) identify a second template with a second associated confidence interval as a next most-likely document template, (ii) identify one or more placeholder data entries in an identified document template that do not have corresponding entries in the uploaded one or more documents, (iii) proactively determine one or more additional data entries from a source other than the one or more uploaded documents that enable the system to fill each placeholder data entry in an identified document template with a corresponding data entry.

Figure 2:
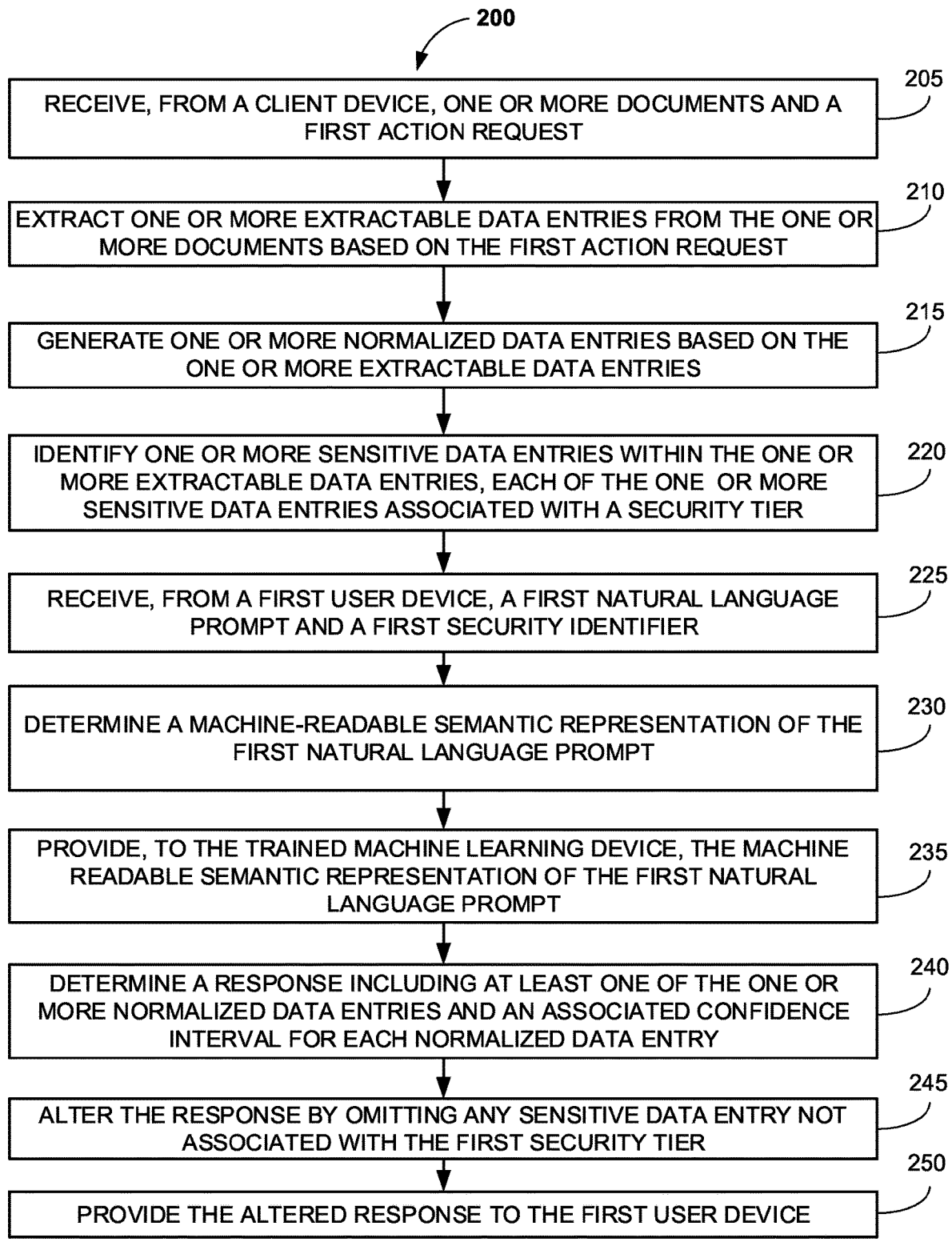
FIG. 2 is a flow diagram 200 illustrating examples of methods for secure data extraction from source documents, according to an example implementation of the disclosed technology.

FIG. 2 is a flow diagram 200 illustrating examples of methods for secure data extraction from source documents, according to an example implementation of the disclosed technology. In block 205, the system may receive, from a client device, one or more documents and a first action request. The first action request may include a request for an approval of a home loan application, an automotive loan approval, an approval for a credit card, an approval for an extension of credit, an approval for an automotive loan refinance, an approval for a mortgage refinance, etc. The one or more documents may include information related to the first action request. For example, the client may upload documents related to the client's credit history as well as information identifying a vehicle, including the VIN, mileage, MSRP, included options, etc. as part of the one or more documents.

In block 210, the system (e.g., machine learning device 520) may extract one or more extractable data entries from the one or more documents. According to some embodiments, the one or more extractable data entries may be based in part on the first action request. For example, when the first action request is for an approval of an automotive loan, the system (e.g., machine learning device 520) may utilize technologies such as optical character recognition in order to parse the text of the one or more documents, and extract relevant data, such as a VIN number associated with a vehicle, a vehicle cost, a total requested loan amount, requested interest rate, etc. According to some embodiments, the system (e.g., machine learning device 520) may utilize one or more of a rule-based platform (e.g., rule-based platform 690) and/or machine learning model (e.g., machine learning model 695) to extract one or more extractable data entries from the one or more documents.

In block 215, the system may generate one or more normalized data entries based on the one or more extractable data entries. For example, if the extractable data entry 108 comprises an SSN in the form 123-45-7890, it may be normalized to 123457890 according to a business ruleset (e.g., rule-based platform 690). The rule-based platform may include standardization routines for commonly detected data types. For example, the rule-based platform may include instructions to remove all punctuation from an extracted phone number (e.g., (441)958-3321 would become 4419583321). As a further nonlimiting example, the rule-based platform may cause the system (e.g., machine learning device 520) to normalize an extractable data entry comprising a street address by formatting it to observe United States Postal Service (USPS) postal addressing standards. USPS postal addressing standards include standardized abbreviations for common street markers such as "Ave." for Avenue and "St." for Street. Accordingly, the business ruleset may format extractable data entries including postal addresses to observe these standards. As described above with respect to block 115, the system may normalize a GPS and/or a business name as a street address.

In block 220, the system may identify one or more sensitive data entries within the one or more extractable data entries. According to some embodiments, each of the one or more sensitive data entries within the one or more extractable data entries may be associated with a security tier of a plurality of security tiers. For example, extractable data entries in the form of a nine-digit number may be identified as a SSN, and accordingly, labeled as a sensitive data entry. Other sensitive data entries may be identified, including but not limited to, bank account numbers associated with a client, credit card numbers associated with a client, a username and/or password associated with a client, a driver's license number, a passport number, a government ID number, etc. A rule-based platform (e.g., rule-based platform 690) and/or machine learning model (e.g., machine learning model 695) may be utilized by the system to identify sensitive data entries. For example, the rule-based platform may include business rulesets that identify certain patterns as being indicative of a sensitive data entry, such as a nine-digit numeric entry in the form of XXX-XX-XXXX. The machine learning model may be trained to identify sensitive data entries based on previous user feedback, provided, for example, by a user or auditor (e.g., via user device 502B).

In block 225, the system may receive, from a first user device, a first natural language prompt and a first security identifier. For example, the first natural language prompt may include either written or spoken natural language in the form of a question to the system to identify one or more articles of relevant information based on the given prompt. The first user device may be used by a customer service representative having a first security tier, or an auditor having a second security tier. Each security tier may be associated with access to some, but not necessarily all, sensitive data entries identified by the system. For example, sensitive data entries associated with the first security tier may be provided to a user device that has the first security identifier. Sensitive data entries associated with an elevated second security tier may be unavailable to a user device having the first security tier. In contrast, according to some embodiments, a user having the elevated second security tier may have access to sensitive data entries associated with the first security tier, while in other embodiments, second security tier users are only given access to sensitive data entries associated with the second security tier. According to some embodiments, a driver's license number, a vehicle identification number, and the like may be associated with the first security tier. According to some embodiments, credit card numbers, bank account numbers, passport numbers, social security numbers, etc. may be associated with the second security tier. The first natural language prompt may include a request for the system to provide the user with one or more data entries, such as, for example, a client's credit score, a client's yearly income, a VIN associated with an automotive loan, a house address associated with a mortgage application, etc.

In block 230, the system may determine a machine-readable semantic representation of the first natural language prompt. For example, a natural language processing (NLP) device (e.g., NLP device 524) may receive the natural language prompt from the first user device, and apply natural language processing methods to extract the meaning of the natural language prompt. According to some embodiments, the NLP device may generate a machine-readable semantic representation comprising machine-readable code that relates the meaning of the natural language prompt to other components of the system that are not capable of directly interpreting natural language prompts from a user. In some embodiments, when the NLP device generates a semantic representation having an associated confidence interval below a predetermined threshold, the NLP device may generate a machine-readable message to the machine learning device (e.g., machine learning device 520) indicating that the NLP device was unsuccessful in generating a machine-readable semantic representation of the natural language prompt (e.g., via event queue 660). Accordingly, the machine learning device may instruct (e.g., via command queue 670) the NLP device (e.g., NLP device 524) to issue a follow-up natural language response to the user to prompt the user to repeat or rephrase the first natural language prompt.

In block 235, the system (e.g., NLP device 524) may provide to the trained machine learning device (e.g., machine learning device 520) the machine-readable semantic representation of the first natural language prompt. The machine learning device may receive the machine-readable semantic representation of the first natural language prompt in the form of machine-readable code that relates the meaning of the natural language prompt in a format that the machine learning device can interpret.

In block 240, the system (e.g., machine learning device 520) may determine a response to the user based on the received first natural language prompt. The response may comprise a natural language response which may include at least one of the one or more normalized data entries. Each normalized data entry that is included in the response may additionally include an associated confidence interval. As part of the response, the machine learning device 520 may issue commands to the user device to generate a graphical user interface that includes the one or more normalized data entries highlighted in a color associated with the determined confidence interval for each of the normalized data entries. For example, normalized data entries having a 90% or higher associated confidence interval may be highlighted in green in the graphical user interface provided to the user (e.g., via user device 502B). Normalized data entries having a confidence interval between 80% and 90% may be highlighted in yellow in the graphical user interface provided to the user. Normalized data entries having a confidence interval less than 80% may be highlighted in red in the graphical user interface provided to the user. Accordingly, the responses generated by the system and provided to the user via the user device may include graphically generated responses that are color coded to efficiently display confidence intervals associated with each component of the response.

In block 245, the system may alter the response by omitting any sensitive data entry not associated with the first security tier. According to some embodiments, the system may generate a graphical user interface to be provided to the requesting user device (e.g., user device 502B) that includes blank entries in place of the one or more sensitive data entries not associated with the security tier of the user device (e.g., the first security tier). According to some embodiments, each sensitive data entry omitted from the response may be automatically replaced by a tokenized data entry in order to maintain the client's information security. For example, the system may tokenize an SSN such as 123456789 by encrypting the sensitive data entry with an encryption key stored securely on the system 500 and return a tokenized data entry to the user device (e.g., user device 502B) iZoBOe97b in place of the SSN 123456789. The system may store the unencrypted sensitive data entry only temporarily in RAM to further secure the sensitive data so that only the tokenized version of the sensitive data entry is permanently or semi-permanently stored on the system. The tokenized data entry may be used in place of the sensitive data entry when providing the response to the user device (e.g., user device 502B). According to some embodiments, block 245 may be performed with determining the response to the user in block 240.

In block 250, the system may provide the altered response to the first user device (e.g., user device 502B). For example, and as described above, the system (e.g., machine learning device 520) may generate a graphical user interface to be provided on the user device. The graphical user interface may include one or more of the normalized data entries with sensitive data entries omitted or tokenized from the generated graphical user interface to secure the client's sensitive information. In some embodiments, omitted data entries are highlighted in blue to identify that a sensitive data entry has been omitted from the generated response due to the respective sensitive data entry not being associated with the first security tier (e.g., based on the security identifier received from the user device 502B). According to some embodiments, the altered response may include an identified document template associated with the action request received from the client device. The identified document template may relate to a form that must be completed by a representative or auditor associated with system 500 in order to approve the client's action request. For example, when the client action request is an approval for an automotive loan, the identified document template may include all placeholder entries associated with each data entry necessary to approve or deny the client's automotive loan application. Accordingly, the response provided to the user device (e.g., user device 520B) may include a graphical user interface including the identified document template, with normalized data entries proactively filled in place of one or more placeholder entries, and sensitive data entries either omitted from the response (and their corresponding placeholder data entries highlighted in blue) and/or sensitive data entries being filled into their corresponding placeholder data entries as a tokenized data entry to protect the client's private data. According to some embodiments, tokenized data entries may similarly be highlighted in blue, or alternatively may be highlighted in a different color to identify the tokenized data entry.

According to some embodiments, the system may identify at least a first sensitive data entry having a first security tier and a second sensitive data entry having a second security tier. The second security tier may be associated with an elevated security and may be associated with sensitive data entries that require increased security protocols. For example, according to some embodiments, only a user device having a second security identifier associated with the second security tier may access sensitive data entries identified as associated with the second security tier. According to some embodiments, the system may generate a first natural language response that includes (i) the first sensitive data entry and (ii) a request to verify the first sensitive data entry and a second natural language response that includes (i) the second sensitive data entry and (ii) a request to verify the second sensitive data entry. The first natural language response may be transmitted to the first user device associated with the first security tier, and the second natural language response may be transmitted to the second user device associated with the second security tier.

Figure 3:
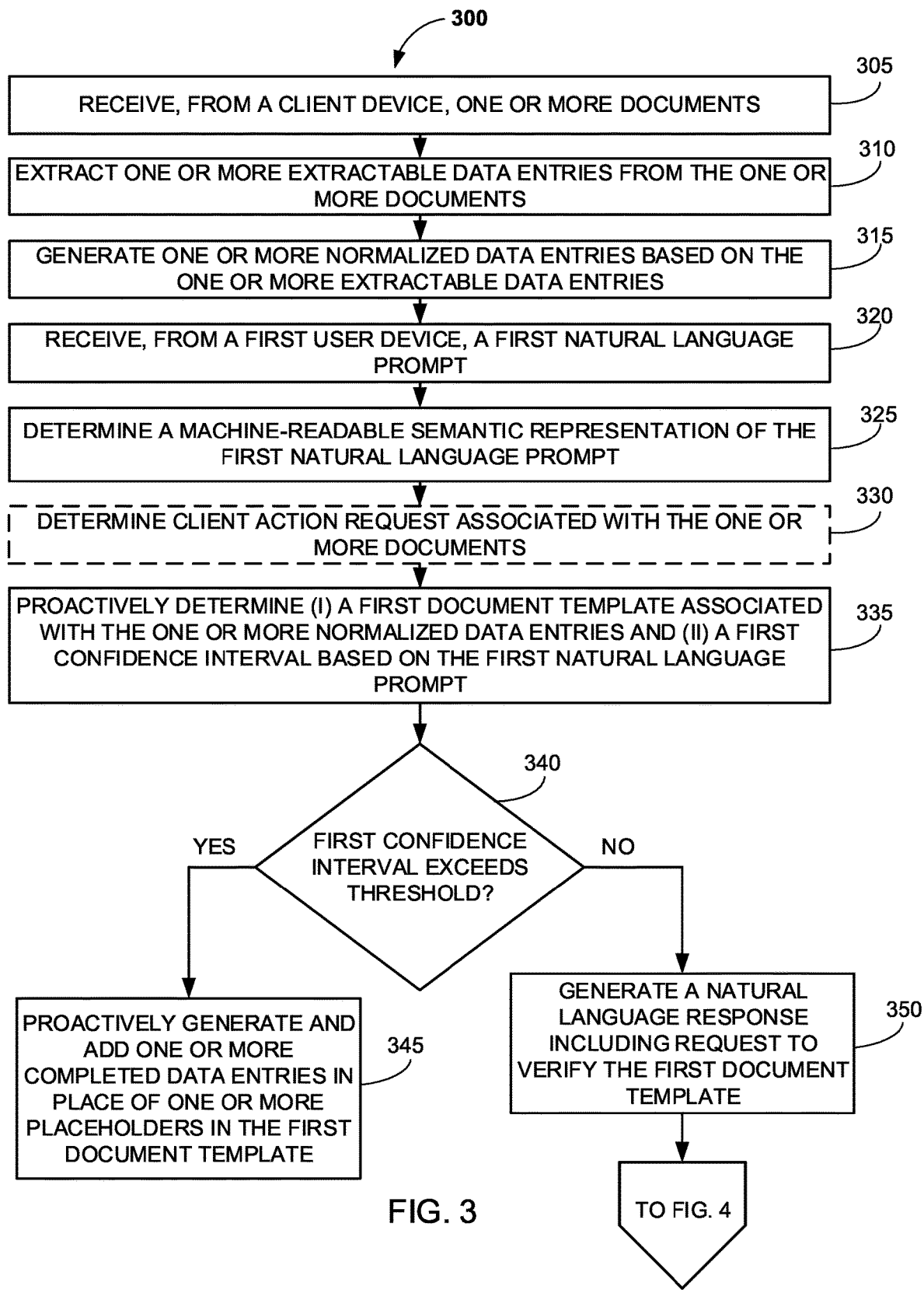
FIG. 3 is a flow diagram 300 illustrating examples of methods for secure data extraction from source documents, according to an example implementation of the disclosed technology.

FIG. 3 is a flow diagram 300 illustrating examples of methods for secure data extraction from source documents, according to an example implementation of the disclosed technology. In block 305, the system may receive, from a client device, one or more documents. The one or more documents may include information related to the first action request. For example, the client may upload documents related to the client's credit history as well as information identifying a vehicle, including the VIN, mileage, MSRP, included options, etc. as part of the one or more documents. Received documents may be uploaded to the system by a client device (e.g., via communication between client device 502A and one or more components of system 500, including via web server 510, API server 522, NLP device 524, and/or transaction server 512, described in more detail with respect to FIG. 5).

In block 310, the system (e.g., machine learning device 520) may extract one or more extractable data entries from the one or more documents. For example, when the first action request is for an approval of an automotive loan, the system (e.g., machine learning device 520) may utilize technologies such as optical character recognition in order to parse the text of the one or more documents, and extract relevant data, such as a VIN number associated with a vehicle, a vehicle cost, a total requested loan amount, requested interest rate, etc. According to some embodiments, the system (e.g., machine learning device 520) may utilize one or more of a rule-based platform (e.g., rule-based platform 690) and/or machine learning model (e.g., machine learning model 695) to extract one or more extractable data entries from the one or more documents.

In block 315, the system may generate one or more normalized data entries based on the one or more extractable data entries. For example, if the extractable data entry 108 comprises an SSN in the form 123-45-7890, it may be normalized to 123457890 according to a business ruleset (e.g., rule-based platform 690). The rule-based platform may include standardization routines for commonly detected data types. For example, the rule-based platform may include instructions to remove all punctuation from an extracted phone number (e.g., (441)958-3321 would become 4419583321). As a further nonlimiting example, the rule-based platform may cause the system (e.g., machine learning device 520) to normalize an extractable data entry comprising a street address by formatting it to observe United States Postal Service (USPS) postal addressing standards. USPS postal addressing standards include standardized abbreviations for common street markers such as "Ave." for Avenue and "St." for Street. Accordingly, the business ruleset may format extractable data entries including postal addresses to observe these standards. As described above with respect to block 115, the system may normalize a GPS and/or a business name as a street address. As a further nonlimiting example, the rule-based platform may cause the system (e.g., machine learning device 520) to normalize a client's income. For example, if the system receives a client's yearly income, it may convert it to a net monthly income (e.g., using rule-based platform 690 to convert yearly gross income into monthly net income). In another nonlimiting example, the system may determine a home value or appraisal based on a provided home address.

In block 320, the system may receive, from a first user device, a first natural language prompt. For example, the first natural language prompt may include either written or spoken natural language in the form of a question to the system to identify one or more articles of relevant information based on the given prompt. The first natural language prompt may include a request for the system to provide the user with one or more data entries, such as, for example, a client's credit score, a client's yearly income, a VIN associated with an automotive loan, a house address associated with a mortgage application, etc.

In block 325, the system may determine a machine-readable semantic representation of the first natural language prompt. For example, a natural language processing (NLP) device (e.g., NLP device 524) may receive the natural language prompt from the first user device, and apply natural language processing methods to extract the meaning of the natural language prompt. According to some embodiments, the NLP device may generate a machine-readable semantic representation comprising code that relates the meaning of the natural language prompt to other components of the system that are not capable of directly interpreting natural language prompts from a user.

In optional block 330, the system (e.g., machine learning device 520) may determine a client action request associated with the one or more documents. For example, the system may utilize the machine-readable semantic representation of the first natural language prompt, the one or more uploaded documents, and the one or more normalized data entries in order to identify one or more document templates that are potentially associated with the uploaded one or more documents and a potential client action request (such as requesting approval for an automotive loan product). Each potential client action request may include an associated confidence interval. When the confidence interval for a highest ranked potential action request exceeds a predetermined threshold, the system may determine the highest ranked potential action request as a first action request.

In block 335, the system may proactively determine a first document template associated with the one or more normalized data entries and a first confidence interval based on the first natural language prompt. According to some embodiments, determining a first document template may be based in part on determining a client action request associated with the one or more documents uploaded by the client (e.g., via client device 502A).

In decision block 340, the system (e.g., machine learning device 520) may determine whether the first confidence interval exceeds the predetermined threshold. When the system determines that the first confidence interval exceeds the predetermined threshold, the system may proactively generate and add one or more completed data entries in place of one or more placeholder data entries in the first document template in block 345. For example, the system may determine a correlation between each of the one or more normalized data entries and placeholder entries in the first document template allowing the system to proactively fill the first document template with one or more completed data entries in place of the placeholder entries. According to some embodiments, the one or more completed data entries may be based in part on the one or more normalized data entries. For example, when the first action request is a request for approval of an automotive loan, the system may extract a data entry for the client's SSN, telephone number, salary, previous loan applications, credit history, etc., normalize each extractable data entry to put it into a standardized format for entry into a document template, and identify that the relevant document template is one that includes data entries associated with an automotive loan approval. Each extractable data entry may be normalized, and the normalized data entries may be correlated to one or more placeholders identified in an identified document template. Each successfully correlated normalized data entry—placeholder entry pair may increase the confidence interval associated with the selected/identified document template. Once the document template confidence interval exceeds a predetermined threshold, the system selects the respective document template as associated with the one or more documents uploaded by the client. In some embodiments, identifying the document template may be based on proactively determining a client action request. Accordingly, the system may without any input from a user or auditor (e.g., user of a user device 502B) proactively fill a relevant document template with one or more completed data entries to streamline the approval process for a client action request, such as a first action request.

In block 350, responsive to the system determining that the first confidence interval does not exceed the predetermined threshold, the system may generate a natural language response that may be provided to the user device (e.g., user device 502B). According to some embodiments, the generated natural language response may include a request to verify the first document template. According to some embodiments, the natural language response may include a graphical user interface. As part of the response, the machine learning device 520 may issue commands to the user device to generate a graphical user interface that identifies (i) the document template and the associated confidence interval (e.g., green highlighted color for 90%+confidence), and (ii) the one or more normalized data entries highlighted in a color associated with the determined confidence interval for each of the normalized data entries. For example, normalized data entries having a 90% or higher associated confidence interval may be highlighted in green in the graphical user interface provided to the user (e.g., via user device 502B). Normalized data entries having a confidence interval between 80% and 90% may be highlighted in yellow in the graphical user interface provided to the user. Normalized data entries having a confidence interval less than 80% may be highlighted in red in the graphical user interface provided to the user. Accordingly, the responses generated by the system and provided to the user via the user device may include graphically generated responses that are color coded to efficiently display confidence intervals associated with each component of the response and the confidence interval for the identified document template.

Figure 4:
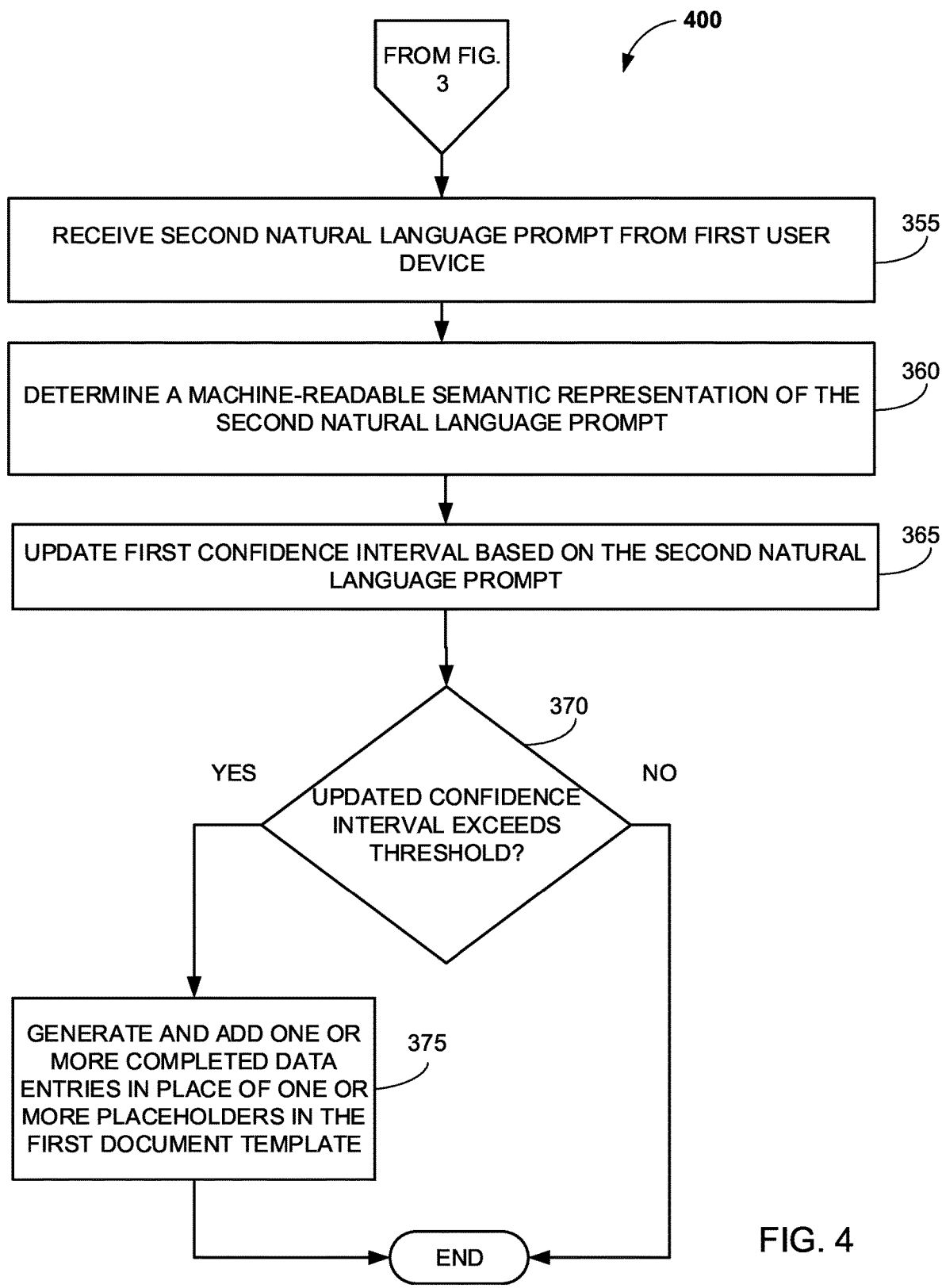
FIG. 4 is a flow diagram 400 illustrating examples of methods for secure data extraction from source documents, according to an example implementation of the disclosed technology.

FIG. 4 is a flow diagram 400 illustrating examples of methods for secure data extraction from source documents, according to an example implementation of the disclosed technology. In block 355, the system may receive a second natural language prompt from the first user device (e.g., user device 502B). Block 355 may be substantially similar to block 320 and a full description is omitted here for brevity.

In block 360, the system may determine a machine-readable semantic representation of the second natural language prompt. Block 360 may be substantially similar to block 325 and a full description is omitted here for brevity.

In block 365, the system may update the first confidence interval based on the second natural language prompt. The first confidence interval may be associated with identifying the first document template associated with the one or more documents uploaded by the client. For example, the system may parse the natural language prompt, and based on the results of the prompt, may update the confidence interval. According to some embodiments, as part of updating the confidence interval, the system may further search one or more databases and/or servers (e.g., database 518, database 680, database 534, database 544, database 554, database 564, and/or third-party server 526) for additional information associated with the client (e.g., client account information, previous applications, credit history, etc.). For example, the system (e.g., machine learning device 520) may be prompted (e.g., by command queue 670, discussed in more detail with respect to FIGS. 6-7) to search one or more databases and/or servers for additional information based on (i) a semantic meaning extracted from natural language prompts (e.g., information provided by the user related to the client) and/or (ii) extractable data entries extracted from the one or more documents provided by the client device.

In decision block 370, the system may determine whether the updated confidence interval associated with the identified document template exceeds the predetermined threshold. In block 375, responsive to determining that the updated confidence interval exceeds the predetermined threshold, the system may generate and add one or more completed data entries in place of one or more placeholder entries in the identified document template. For example, the system may generate a graphical user interface representing at least the (i) identified document template; (ii) document template confidence interval; (iii) completed data entries; (iv) completed data entries confidence intervals. The confidence intervals (ii) and (iv) may be identified with highlighting of various colors, depending on the value of the respective confidence interval. For example, a confidence interval 90% or higher may be indicated by a green highlighted color, a confidence interval between 80% and 90% may be indicated by a yellow highlighted color, and a confidence interval less than 80% may be indicated by a red highlighted color. According to some embodiments, the user (e.g., via user device 502B) may graphically interact with the results via the graphical user interface. For example, the user may provide feedback verifying an accuracy of a completed data entry and/or of the identified document template, which may be used to iteratively update and improve an accuracy with which one or more of the machine learning model (e.g., machine learning model 695) and/or the rule-based platform (e.g., rule-based platform 690) can determine a client action request based on the documents uploaded by the client and the data entries extracted therefrom. According to some embodiments, the system may selectively only show highlighted completed data entries for data entries having less than a 90% confidence interval. In some embodiments, The system may receive user feedback verifying the accuracy of the identified document template. In some embodiments, the system may receive user feedback verifying the accuracy of the completed data entry. In some embodiments, the system may verify the completed data entry based in part on additional queries of one or more databases and/or servers (e.g., database 518, database 680, database 534, database 544, database 554, database 564, and/or third-party server 526)

According to some embodiments, when no document template may be identified with a confidence interval exceeding the predetermined threshold, the system may determine that the client action request is a new action request that has not been previously encountered by the system. The system may receive manual feedback from a user device (e.g., user device 502B) that indicates which data entries of the one or more extractable data entries are necessary to fulfill the client action request. Based on the manual feedback and the one or more extractable data entries, the system may generate a new document template and store the document template (e.g., on database 518 and/or 680) for future use (e.g., when the system identifies the new action request while processing a later application from a different client).

Figure 5:
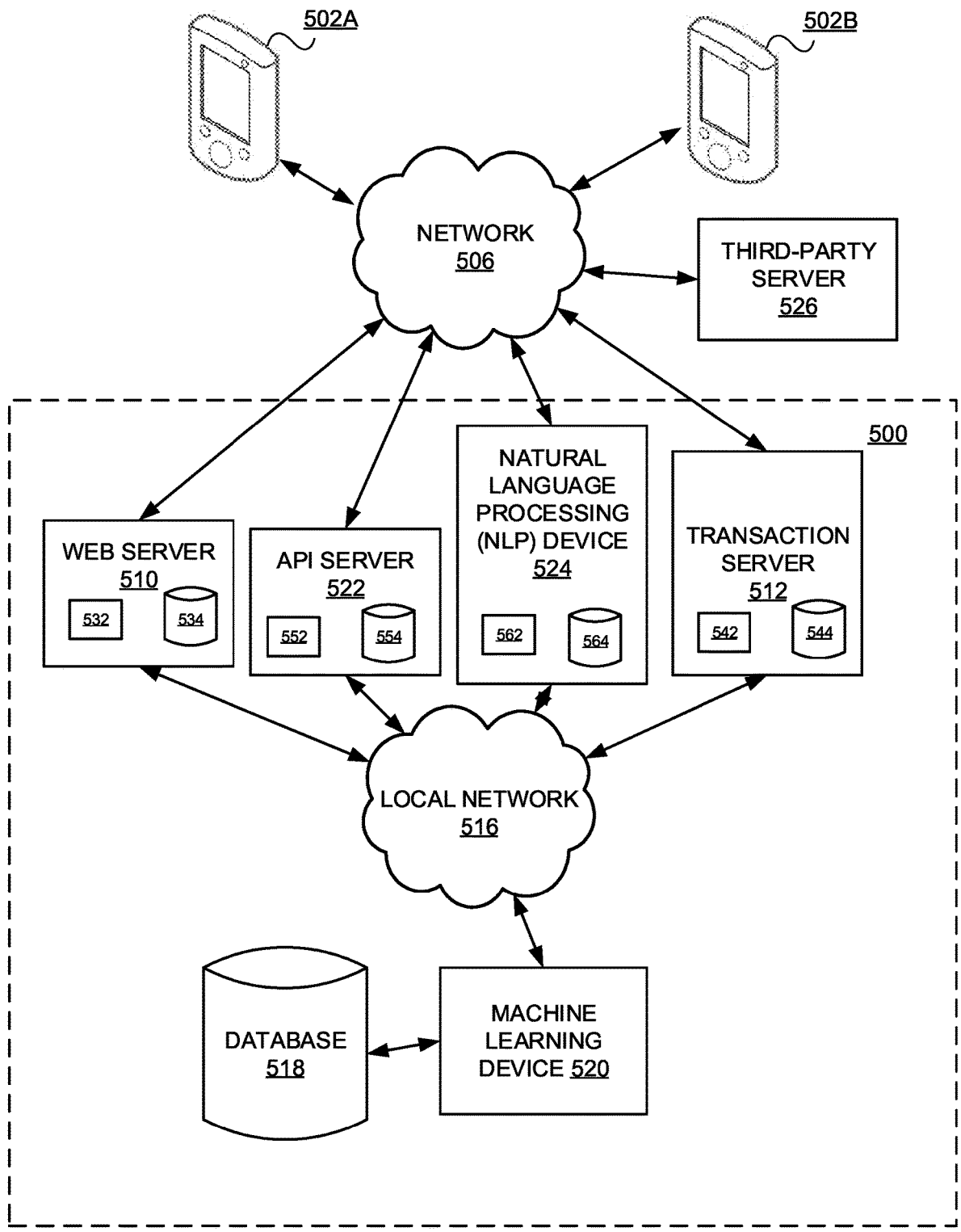
FIG. 5 is a block diagram of an example system 500 that may be used for proactively extracting data from complex documents and/or secure data extraction from source documents, according to example implementations of the disclosed technology.

FIG. 5 is a block diagram of an example system 500 that may be used to proactively extract data from complex documents, interpret natural language prompts from a user, and generate natural language responses to the natural language prompts received from the user. The system 500 may be configured to perform one or more processes that can adaptively generate responses based on an evolving context associated with client interactions, client profiles, etc. The components and arrangements shown in FIG. 5 are not intended to limit the disclosed embodiments as the components used to implement the disclosed processes and features may vary. As shown, system 500 may interact with one or more client device(s) 502A and one or more user device(s) 502B via a network 506. In certain example implementations, the system 500 may include a web server 510, a transaction server 512, a local network 516, a machine learning device 520, a database 518, an API server 522, a Natural Language Processing device 524 (which may be referred to herein as an NLP device 524), and a third-party server 526.

In some embodiments, a client requesting a service or product may operate client device 502A. The client device 502A can include one or more of a mobile device, smart phone, general purpose computer, tablet computer, laptop computer, telephone, PSTN landline, smart wearable device, voice command device, other mobile computing device, or any other device capable of communicating with the network 506 and ultimately communicating with one or more components of the system 500. In some embodiments, client device 502 may include or incorporate electronic communication devices for hearing or vision impaired users.

Clients may include individuals such as, for example, subscribers, clients, prospective clients, or customers of an entity associated with an organization, such as individuals who have obtained, will obtain, or may obtain a product, service, or consultation from an entity associated with the system 500. According to some embodiments, client device 502A may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

According to some embodiments, a user associated with an organization may operate user device 502B. The user device 502B can include one or more of a mobile device, smart phone, general purpose computer, tablet computer, laptop computer, telephone, PSTN landline, smart wearable device, voice command device, other mobile computing device, or any other device capable of communicating with the network 506 and ultimately communicating with one or more components of the system 500. In some embodiments, user device 502B may include or incorporate electronic communication devices for hearing or vision impaired users.

Users may include individuals, such as customer service representatives and/or auditors associated with an organization and system 500. According to some embodiments, user device 502B may include some or all of the components described with respect to client device 502A.

The network 506 may be of any suitable type, including individual connections via the internet such as cellular or WiFi networks. In some embodiments, the network 506 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 506 may include any type of computer networking arrangement used to exchange data. For example, the network 506 may be the Internet, a private data network, virtual private network using a public network, and/or other suitable connection(s) that enable(s) components in the system 500 environment to send and receive information between the components of the system 500. The network 506 may also include a public switched telephone network ("PSTN") and/or a wireless network.

In accordance with certain example implementations, a third-party server 526 may be in communication with the system 500 via the network 506. In certain implementations, the third-party server 526 can include a computer system associated with an entity (other than the entity associated with the system 500 and its customers) that performs one or more functions associated with the customers. For example, the third-party server 526 can include information related to a client profile that is stored by an entity other than the entity associated with system 500.

The system 500 may be associated with and optionally controlled by an entity such as a business, corporation, individual, partnership, or any other entity that provides one or more of goods, services, and consultations to individuals such as clients or customers. The system 500 may include one or more servers and computer systems for performing one or more functions associated with products and/or services that the organization provides. Such servers and computer systems may include, for example, web server 510, transaction server 512, API server 522, as well as any other computer systems necessary to accomplish tasks associated with the organization or the needs of clients (which may be customers of the entity associated with the organization). The web server 510 may include a computer system configured to generate and provide one or more websites accessible to clients, as well as any other individuals (e.g., customer service representatives and/or case auditors) involved in an organization's normal operations. The web server 510, for example, may include a computer system configured to receive communications from the client device 502A via for example, a mobile application, a chat program, an instant messaging program, a voice-to-text program, an SMS message, email, or any other type or format of written or electronic communication. The web server 510 may have one or more processors 532 and one or more web server databases 534, which may be any suitable repository of website data. Information stored in the web server 510 may be accessed (e.g., retrieved, updated, and added to) via the local network 516 (and/or the network 506) by one or more devices (e.g., the machine learning device 520 and/or the NLP device 524) of the system 500. In some embodiments, one or more processors 532 may be used to implement an automated natural language dialogue system that may interact with a user via different types of communication channels such as a website, mobile application, instant messaging application, SMS message, email, phone, or any other type of spoken or written electronic communication. When receiving an incoming message from, for example, the client device 502A, the web server 510 may be configured to determine the type of communication channel the user device 102 used to generate the incoming message.

The transaction server 512 may include a computer system configured to process one or more transactions involving an account associated with users or customers, or a request received from users or customers. In some embodiments, transactions can include, for example, a product/service purchase, product/service return, financial transfer, financial deposit, financial withdrawal, financial credit, financial debit, dispute request, and any other type of transaction associated with the products and/or services that an entity associated with system 500 provides to individuals such as clients. The transaction server 512 may have one or more processors 542 and one or more transaction server databases 544, which may be any suitable repository of transaction data. Information stored in transaction server 512 may be accessed (e.g., retrieved, updated, and added to) via the local network 516 (and/or network 506) by one or more devices of the system 500.

In some embodiments, the transaction server 512 tracks and stores event data regarding interactions between a third-party, such as a third-party server 526, with the system 500, and on behalf of the individual clients or customers. For example, the transaction server 512 may track third-party interactions such as account withdrawals and deposits, credit checks, background checks, and any other type of interaction that the third-party server 526 may conduct with the system 500 on behalf of an individual such as a client or customer.

The local network 516 may include any type of computer networking arrangement used to exchange data in a localized area, such as WiFi, Bluetooth™ Ethernet, and other suitable network connections that enable components of the system 500 to interact with one another and to connect to the network 506 for interacting with components in the system 500 environment. In some embodiments, the local network 516 may include an interface for communicating with or linking to the network 506. In other embodiments, certain components of the system 500 may communicate via the network 506, without a separate local network 516.

In accordance with certain example implementations of the disclosed technology, the machine learning device 520, which is described more fully below with reference to FIG. 6, may include one or more computer systems configured to compile data from a plurality of sources, such as the web server 510, the transaction server 512, the database 518, API server 522, and/or third party server 526. The machine learning device 520 may correlate compiled data, analyze the compiled data, arrange the compiled data, generate derived data based on the compiled data, and store the compiled and derived data in a database such as the database 518. According to some embodiments, the database 518 may be a database associated with an organization and/or a related entity that stores a variety of information relating to users, clients, transactions, and business operations. The database 518 may also serve as a back-up storage device and may contain data and information that is also stored on, for example, databases 534, 544, 554, 564, (and 680, as will be discussed with reference to FIG. 2). The database 518 may be accessed by the machine learning device 520 and may be used to store records of every interaction, communication, and/or transaction a particular client or customer has had with the organization associated with system 500 in the past to enable the creation of an ever-evolving client context that may enable the machine learning device 520, in conjunction with the NLP device 124, to proactively extract data from complex documents and add the extracted data entries to an identified document template.

In certain example implementations, the API server 522 may include one or more computer systems configured to execute one or more application program interfaces (APIs) that provide various functionalities related to the operations of the system 500. In some embodiments, the API server 522 may include API adapters that enable the API server 522 to interface with and utilize enterprise APIs maintained by an organization and/or an associated entity that may be housed on other systems or devices. In some embodiments, APIs can provide functions that include, for example, retrieving client account information, modifying client account information, executing a transaction related to an account, authenticating a user, updating a client account to opt-in or opt-out of notifications, and any other such function related to management of client profiles and accounts. The API server 122 may include one or more processors 552 and one or more API databases 554, which may be any suitable repository of API data. Information stored in the API server 522 may be accessed (e.g., retrieved, updated, and added to) via the local network 516 (and/or network 506) by one or more devices (e.g., machine learning device 520) of system 500. In some embodiments, the API processor 552 may be used to implement one or more APIs that can access, modify, and retrieve user account information.

In certain embodiments, real-time APIs consistent with certain disclosed embodiments may use Representational State Transfer (REST) style architecture, and in this scenario, the real time API may be called a RESTful API.

In certain embodiments, a real-time API may include a set of Hypertext Transfer Protocol (HTTP) request messages and a definition of the structure of response messages. In certain aspects, the API may allow a software application, which is written against the API and installed on a client (such as, for example, the transaction server 512) to exchange data with a server that implements the API (such as, for example, the API server 522), in a request-response pattern. In certain embodiments, the request-response pattern defined by the API may be configured in a synchronous fashion and may require that the response be provided in real-time. In some embodiments, a response message from the server to the client through the API consistent with the disclosed embodiments may be in formats including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). In certain example implementations, the client may send GET and POST requests with JSON serialized parameters in the body. Preferably, the requests with JSON serialized parameters use "application/j son" content-type. In another aspect, an API design may also require the server implementing the API return messages in JSON format in response to the request calls from the client.

In accordance with certain example implementations of the disclosed technology, the NLP device 524 may include a computer system configured to receive and process incoming messages and determine a meaning (e.g., semantic representation) of the incoming message. For example, the NLP device 524 may be configured to receive and execute commands (for example, from the machine learning device 520) that instructs the NLP device 524 to determine the meaning of the incoming dialogue message. In certain example implementations, the machine learning device 520 may issue dialog modifying commands to the NLP device 124, for example, that instruct the NLP device 524 to formulate/revise a response based on rules and/or determined information related to the communication, etc. Thus, in certain example implementations, the machine learning device 520 may program the NLP device 524.

As will be discussed further with reference to FIG. 7, the NLP device 524 may be configured to continuously or intermittently listen for and receive commands from a command queue to determine if there are any new commands directed to the NLP device 524. Upon receiving and processing an incoming communication (e.g., natural language prompt received from a user device 502B), the NLP device 524 may output the meaning of an incoming dialogue message in a format that other devices can process. For example, the NLP device 524 may receive an incoming message stating: "What credit score is required to be approved for this automotive loan?" and may determine that this statement represents a request for data entry associated with a client's credit score. The NLP device 524 may be configured to output an event representing the meaning (e.g., a machine-readable semantic representation) of the incoming message to an event queue for processing by another device (e.g., machine learning device 520) of the system 500. In some embodiments, the NLP device 524 may be configured to generate a natural language phrase in response to receiving a command. Accordingly, in some embodiments, the NLP device 524 may be configured to output an event that contains data representing natural language.

The NLP device 524 may include one or more processors 562 and one or more NLP databases 564, which may be any suitable repository of NLP data. Information stored in the NLP device 524 may be accessed (e.g., retrieved, updated, and added to) via the local network 516 (and/or network 506) by one or more devices (e.g., the machine learning device 520) of system 500. In some embodiments, the NLP processor 562 may be used to implement an NLP system that can determine the meaning behind a string of text and convert it to a form that can be understood by other devices (e.g., as a machine-readable semantic representation of a natural language prompt).

Although described in the above embodiments as being performed by the web server 110, the transaction server 512, the machine learning device 520, the database 518, the API server 522, and the NLP device 524, some or all of those functions may be carried out by a single computing device.

For ease of discussion, embodiments may be described in connection with the generation of automated natural language dialogue in response to an electronic text communication such as an SMS message, chat program message, or an email. It is to be understood, however, that disclosed embodiments are not limited to discourse and/or dialogue in response to written electronic messages and may be used in many other contexts, such as, for example, generating automated natural language dialogue in response to an oral communication such as a phone call. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

Figure 6:
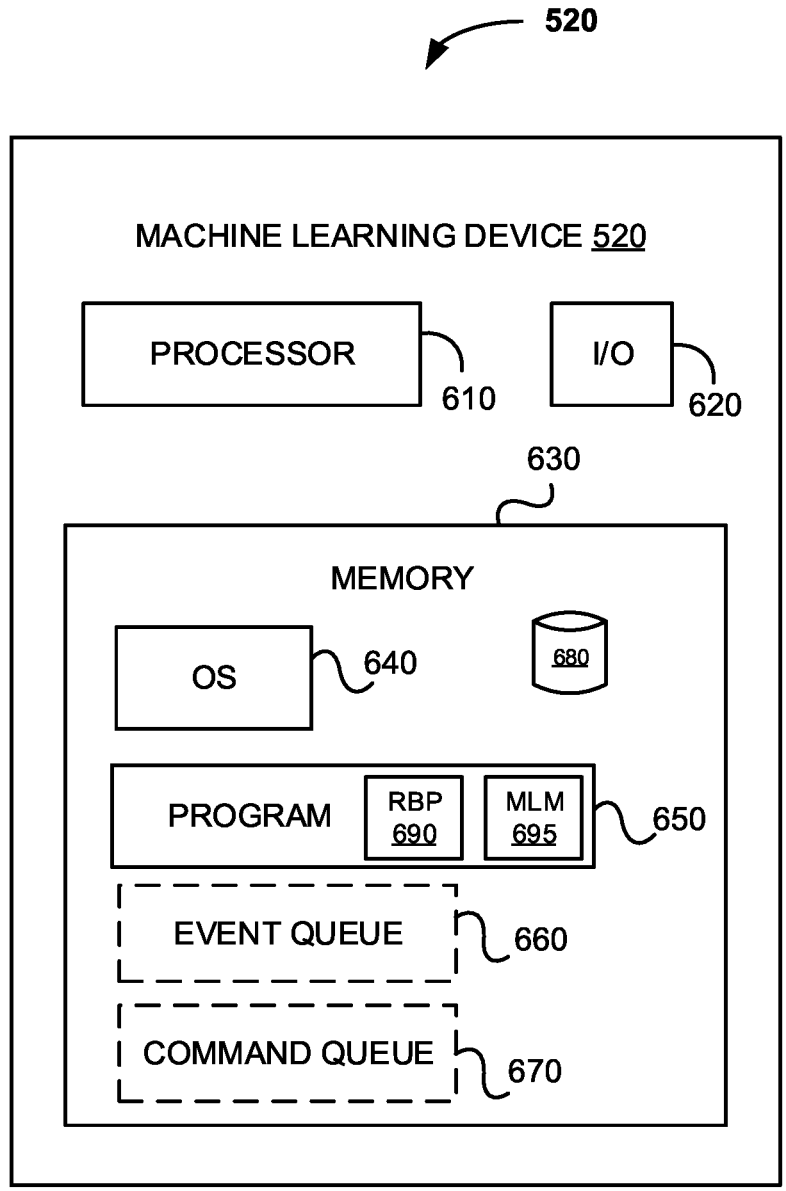
FIG. 6 is a block diagram of an example machine learning device 520, as shown in FIG. 5, with additional details.

FIG. 6 is a block diagram (with additional details) of the example machine learning device 520, as also depicted in FIG. 5. According to some embodiments, the client device 502A, the user device 502B, the web server 510, the transaction server 512, the API server 522, the NLP device 524, and the third-party server 526, as depicted in FIG. 5, may have a similar structure and components that are similar to those described with respect to machine learning device 520 shown in FIG. 6. As shown, the machine learning device 520 may include a processor 610, an input/output ("I/O") device 620, a memory 630 containing an operating system ("OS") 640 and a program 650. In certain example implementations, the machine learning device 520 may be a single server or may be configured as a distributed computer system including multiple servers or computers that interoperate to perform one or more of the processes and functionalities associated with the disclosed embodiments. In some embodiments, the machine learning device 520 may further include a peripheral interface, a transceiver, a mobile network interface in communication with the processor 610, a bus configured to facilitate communication between the various components of the machine learning device 520, and a power source configured to power one or more components of the machine learning device 520.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 610 to communicate with other devices via wired or wireless networks, whether local or wide area, private or public, as known in the art. A power source may be configured to provide an appropriate alternating current (AC) or direct current (DC) to power components.

The processor 610 may include one or more of a microprocessor, microcontroller, digital signal processor, co-processor or the like or combinations thereof capable of executing stored instructions and operating upon stored data. The memory 630 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 630.

The processor 610 may be one or more known processing devices, such as, but not limited to, a microprocessor from the Pentium™ family manufactured by Intel™ or the Turion™ family manufactured by AMD™. The processor 610 may constitute a single core or multiple core processor that executes parallel processes simultaneously. For example, the processor 610 may be a single core processor that is configured with virtual processing technologies. In certain embodiments, the processor 610 may use logical processors to simultaneously execute and control multiple processes. The processor 610 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the machine learning device 520 may include one or more storage devices configured to store information used by the processor 610 (or other components) to perform certain functions related to the disclosed embodiments. In one example, the machine learning device 520 may include the memory 630 that includes instructions to enable the processor 610 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the machine learning device 520 may include a memory 630 that includes instructions that, when executed by the processor 610, perform one or more processes consistent with the functionalities disclosed herein. Methods, systems, and articles of manufacture consistent with disclosed embodiments are not limited to separate programs or computers configured to perform dedicated tasks. For example, the machine learning device 520 may include the memory 630 that may include one or more programs 650 to perform one or more functions of the disclosed embodiments. For example, in some embodiments, the machine learning device 520 may additionally manage dialogue and/or other interactions with the user via a program 650.

In certain example implementations, the program 650 that may include a rule-based platform 690 for generating zero or more commands in response to processing an event in accordance with a set of predefined rules. In some embodiments, the machine learning device 520 may include a trained machine learning model 695 for generating zero or more commands in response to processing an event, in accordance with a model that may be continuously or intermittently updated. Moreover, the processor 610 may execute one or more programs 650 located remotely from the system 500 (such as the system shown in FIG. 5). For example, the system 500 may access one or more remote programs 650 (such as the rule-based platform 690 or the trained machine learning model 695), that, when executed, perform functions related to disclosed embodiments. According to some embodiments, the machine learning model may implement one or more of a recurrent neural network (RNN), a convolutional neural network (CNN), and a transformer to perform one or more steps of a method consistent with the present disclosure.

The memory 630 may include one or more memory devices that store data and instructions used to perform one or more features of the disclosed embodiments. The memory 630 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 630 may include software components that, when executed by the processor 610, perform one or more processes consistent with the disclosed embodiments. In some embodiments, the memory 630 may include a client information database 680 for storing related data to enable the machine learning device 520 to perform one or more of the processes and functionalities associated with the disclosed embodiments.

The client information database 680 may include stored data relating to a user or customer profile and user or customer accounts, such as for example, user identification, name, age, sex, birthday, address, account status, preferences, preferred language, greeting name, preferred communication channel, account numbers, order history, delivery history, authorized users associated with one or more accounts, account balances, account payment history, and other such typical account information. The client information database 680 may further include stored data relating to previous interactions between the organization (or its related entity) and a user. For example, the client information database 680 may store user interaction data that includes records of previous interactions with a user via a website, SMS, a chat program, a mobile application, an IVR system, or notations taken after speaking with a customer service agent. The client information database 680 may also include information about business transactions between the organization (or its related entity) and a user or customer that may be obtained from, for example, the transaction server 512.

The client information database 680 may also include user feedback data such as an indication of whether an automated interaction with a user was successful, online surveys filled out by a client, surveys answered by a client following previous interactions to the company, digital feedback provided through websites or mobile applications associated with the organization or its related entity (e.g., selecting a smiley face or thumbs up to indicate approval), reviews written by a client, complaint forms filled out by a client, information obtained from verbal interactions with a client (e.g., information derived from a transcript of a customer service call with a customer or client that is generated using, for example, voice recognition techniques and/or by NLP device 524) or any other types of communications from a client or customer to the organization or its related entity. According to some embodiments, the functions provided by the client information database may also be provided by a database that is external to the machine learning device 520, such as the database 518 as shown in FIG. 5.

As will be discussed further with reference to FIG. 7, the memory 630 may also include an event queue 660 for temporarily storing queued events and a command queue 670 for temporarily storing queued commands. The processor 610 may receive events from the event queue 660 and in response to processing the event using the rule-based platform 690 and/or the trained machine learning model 695, may generate zero or more commands to be output to the command queue 670. According to some embodiments, the machine learning device 520 may place commands in the command queue 670 in the order they are generated. Each command may be designated to be executed by one or more devices, such as, for example, the web server 510, the transaction server 512, the API server 522, or the NLP device 524 as shown in FIG. 5. Each such device (such as, for example, the API server 522 or NLP device 524) may continuously or intermittently monitor the command queue 670 to detect commands that are designated to be executed by the monitoring device and may access pertinent commands. The event queue 660 may receive events from other devices such as, for example, the client device 502A, the user device 502B, the web server 510, the transaction server 512, the API server 522, and the NLP device 524 as shown in FIG. 5. According to some embodiments, events may be placed in the event queue 660 in a first-in first-out (FIFO) order, such that events may then be processed by the machine learning device 520 in the order they are received or generated.

The machine learning device 520 may also be communicatively connected to one or more memory devices (e.g., databases) locally or through a network. The remote memory devices may be configured to store information and may be accessed and/or managed by the machine learning device 520. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The machine learning device may also include one or more I/O devices 620 that may comprise one or more interfaces for receiving signals or input from devices and providing signals or output to one or more devices that allow data to be received and/or transmitted by the machine learning device 520. For example, the machine learning device 520 may include interface components, which may provide interfaces to one or more input devices, such as one or more keyboards, mouse devices, touch screens, track pads, trackballs, scroll wheels, digital cameras, microphones, sensors, and the like, that enable the machine learning device 520 to receive data from one or more users (such as, for example, via the client device 502A and/or the user device 502B).

In example embodiments of the disclosed technology, the machine learning device 520 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the machine learning device 520 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the machine learning device 520 may include a greater or lesser number of components than those illustrated.

Figure 7:
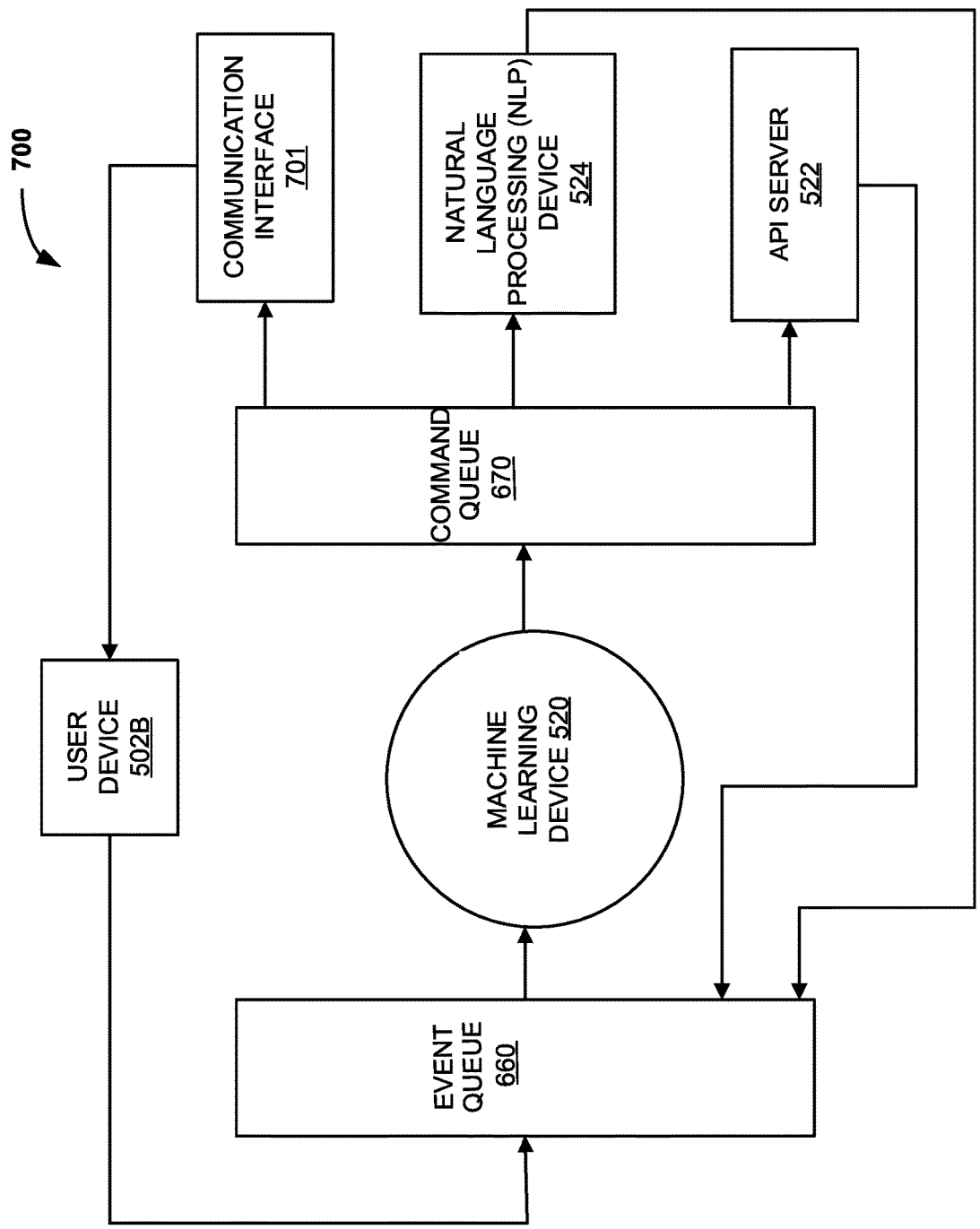
FIG. 7 is a block diagram 700 depicting functionality for using natural language processing and generation, according to an example implementation of the disclosed technology.

FIG. 7 is a block diagram 700 depicting example system functionality for using natural language processing and generation. In certain example implementations, the machine learning device 520 may work in conjunction with the NLP device 524 via queues and feedback loops to: (a) autonomously interpret utterances/messages received from the user device 502B; and (b) gather information pertinent to the interpreted utterances/messages; and (c) program the NLP device 524 (via commands) throughout the interaction(s) that may ultimately lead to proactively identifying a relevant document template, generating one or more extractable data entries based on one or more documents uploaded by a client (e.g., via client device 502A), and adding the one or more extractable data entries to the relevant document template. The methods disclosed herein may correspond to the block diagram 700 shown in FIG. 7, and may be performed by system 500 as discussed above and shown in FIG. 5 entirely or partially via the machine learning device 520 using the processor 610 to execute memory 630 as shown in FIG. 6, and optionally with other steps delegated to other elements in system 500, such as the client device 502A, the user device 502B, the web server 510, the transaction server 512, the API server 522, and/or the NLP device 524.

Responsive to receiving incoming messages from the user device 502B (and/or other events placed in the event queue 660), the machine learning device 520 may generate and provide programming commands to the NLP device 524 via the command queue 670. The programming commands, for example, may cause the NLP device 524 to identify one or more natural language prompts based on the interpreted contents of the incoming message. In certain implementations, a natural language prompt may be identified and output in the form of a specific response via the communication interface 701. In another example implementation, the natural language prompt may be identified and ultimately refined based on further information received from the machine learning device 520 (such as client account information, client credit history, rules, etc.) and output as a meaningful response to the incoming message. In certain example implementations, a relevant document template may be identified and the document template may be proactively filled with extractable data entries found in one or more documents uploaded by a client (e.g., via client device 502A).

In certain example implementations, there can be a pre-established solution space from which responses or resolution measures may be generated. In certain example implementations, the generated response can be a natural-language construct including confirmations and/or corrections of verifiable assertions.

In certain example implementations, the machine learning device 520 in conjunction with the NLP device 524 may be utilized to elicit additional information relevant to the initial message received from the user when insufficient information is available to generate a natural language prompt (e.g., when the extractable data entry associated with a question posed by the user has a confidence measurement less than a predetermined confidence threshold). For example, the NLP device 524 may be instructed by the machine learning device 520 to conduct additional dialogue with the user (via the user device 502B) to: elicit relevant missing information, generate specific information-eliciting utterances, acquire supporting evidence, acquire contrary evidence, abandon a hypothesis, refine a hypothesis, and/or validate one or more extractable data entries as relevant to a selected document template.

In certain example implementations, the NLP device 524 may be instructed by the machine learning device 520 to generate and provide a response based solely on the initial message received from the user, particularly if the initial message received includes verifiable assertions (e.g., machine-readable semantic representations) that can be processed by the NLP device 524.

In certain example implementations, the response may be output via the communication interface 701 in the form of textual, audible, and/or video information that is sent to the user for display/output on the user device 502B associated with the user.

With continued reference to FIG. 7, a first event may be generated and placed in the event queue 660 in response to receiving a message. The event, for example, may be generated based on receiving a message and/or utterance sent via the user device 502B. A message may be received via various communication mediums such as, for example, SMS, a voice-to-text device, a chat application, an instant messaging application, a mobile application, an IVR system, or any other such medium that may be sufficient to send and/or receive electronic communications. In some embodiments, the incoming message may be received by a device of the system 500, as discussed above with respect to FIG. 5, such as web server 510, transaction server 512, API server 522, etc. An event may be generated by, for example, a RESTful API interfacing with the receiving device.

In certain example implementations, the event queue 660 may be configured to temporarily store a plurality of events. According to some embodiments, events are placed in the event queue in a first-in first-out (FIFO) manner, such that the events will be executed in the order that they were received. In some embodiments, the event queue 660 and/or the command queue 670 may be part of machine learning device 520. In some embodiments, both the event queue 660 and the command queue 670 may be present on a device or component other than the machine learning device 520. For example, in some examples, the event queue 660 and the command queue 670 may be maintained on a cloud server that is accessible by the machine learning device 520, the API server 522, the NLP device 524, and/or the communication interface 701. According to some embodiments, an event may represent different types of information that can trigger or present an opportunity to respond to a received message.

According to some embodiments, the machine learning device 520 may continuously or intermittently monitor the event queue 660. In response to detecting an event (e.g., the first event) in the event queue, the event may be received at the machine learning device 520 from the event queue 660. In some embodiments, the machine learning device 520 may include a rule-based platform, a trained machine learning model, and/or a database storing user context/order information that may be derived from client information associated with one or more clients or customers that is stored in other database such as, for example, the database 518 and/or database 680 as discussed above with respect to FIG. 5 and/or FIG. 6. In some embodiments, the client information may include one or more of account types, account statuses, transaction history, and conversation history. According to an example implementation of the disclosed technology, the client context/order information may allow the system 500 to generate customized responses for one or more clients. According to some embodiments, the client context/order information may be updated by the machine learning device 520 upon receiving updated user or order information from, for example, the database 518.

The machine learning device 520 may, in response to processing the first event, generate a first command to be placed in a command queue 670. According to some embodiments, the machine learning device 520 may generate a command based on the processed event and/or the client context/order information using one or more of a rule-based platform 690 and a trained machine learning model 695, as discussed above with reference to FIG. 6. For example, in some use cases a command may be generated using the rule-based platform 690, whereas in other use cases, a command may be generated using the trained machine learning model 695, and further use cases may be handled by both working in concert. In some embodiments, the trained machine learning model 695 may be used as a way of enhancing the performance of the rule-based platform 690 by, for example, determining which rules have priority over other rules and what rules should be applied in a given context. According to some embodiments, the commands generated by the machine learning device 520 in response to a particular event may change as the client context/account information is updated over time. Further, changes to the rules in the rule-based platform 690 or further training of the machine learning model 695 may also result in different commands being generated in response to the same event based on previous results (e.g., successful identification and filling of a document template associated with a client request).

According to some embodiments, and in reference to the machine learning device discussed in FIG. 5, FIG. 6, and FIG. 7, the trained machine learning model 695 may be trained by updating an NLP database 564 (as discussed above with respect to FIG. 5) with communications from client that have been labeled using, for example, a web user interface (e.g., web server 510). The data in the NLP database 574 may undergo supervised training in a neural network model using a neural network training algorithm while the model is offline before being deployed in the system 500. According to some embodiments, an NLP model of the system 500 may utilize deep learning models such as a convolutional neural network (CNN) and long short-term memory (LSTM). The NLP model may also be trained to recognize named entities in addition to intents. For example, a named entity may include persons, places, organizations, account types, and product types. According to some embodiments, when the machine learning device 520 generates a command, such as a first command, it may determine an entity that will execute the command, such as, for example, the API server 522, the NLP device 524, a communication interface 701, or some other device or component, such that only the determined type of entity may pull the command from the command queue 670. For example, in the embodiment shown in FIG. 7, the machine learning device 520 may determine that the first command is to be executed by the NLP device 524 in order to determine the meaning of the incoming message. According to some embodiments, at the time the machine learning device 520 creates a new command, the machine learning device 520 may also update the client information database 680 (or alternatively, external database 518) with information about a previous or concurrent transaction or client interaction.

In certain example implementations, the NLP device 524 may receive the first command from the command queue 670, execute the command, and generate a second event to be placed in the event queue 660. According to some embodiments, the NLP device 524 may continuously or intermittently monitor the command queue 670 to detect new commands and upon detecting a new command, may receive the command from the command queue 670. Upon receiving a command, the NLP device 524 may perform various functions depending on the nature of the command. For example, in some cases, NLP device 524 may determine the meaning (e.g., a semantic meaning) of an incoming message in response to executing the command. According to some embodiments, the NLP device 524 may translate a natural language prompt into a machine-readable semantic representation of the natural language prompt, which may be provided to machine learning device 520 as part of event queue 660. According to some embodiments, NLP device 524 may determine the meaning of an incoming message and/or additional dialogue by utilizing one or more of the following artificial intelligence (AI) techniques: intent classification, named entity recognition, sentiment analysis, relation extraction, semantic role labeling, question analysis, rule extraction and discovery, and story understanding.

Intent classification may include mapping text, audio, video, or other media into an intent chosen from a set of intents, which represent what a user is stating, uttering, requesting, commanding, asking, or promising in, for example, an incoming message or communication. Intent classifications may include, for example, a request for an explanation for a perceived irregularity, a request for a confirmation, an indication of satisfaction, or any other intent a user may have in communicating a message. Named entity recognition may involve identifying named entities such as persons, places, transaction values, organizations, account types, and product types in text, audio, video, or other media.

Sentiment analysis may involve mapping text, audio, video, or other media into an emotion chosen from a set of emotions. For example, a set of emotions may include positive, negative, anger, anticipation, disgust, distrust, fear, happiness, joy, sadness, surprise, and/or trust. Relation extraction may involve identifying relations between one or more named entities in text, audio, video, or other media. A relation may be for example, a "customer of" relation that indicates that a person is a customer of an organization. Semantic role labeling may involve identifying predicates along with roles that participants play in text, audio, video, or other media. An example of semantic role labeling may be identifying (1) the predicate "to sell", (2) Mary, who plays the role of Agent, (3) book, which plays the role of goods, and (4) John, who plays the role of recipient in the sentence "Mary sold the book to John." Question analysis may involve performing natural language analysis on a question, including syntactic parsing, intent classification, semantic role labeling, relation extraction, information extraction, classifying the type of question, and identifying what type of entity is being requested.

Rule extraction and discovery may involve extracting general inference rules in text, audio, video, or other media. An example of rule extraction may be extracting the rule that "When a person turns on a light, the light will light up" from "Matt turned on the light, but it didn't light up." Story understanding may involve taking a story and identifying story elements including (1) events, processes, and states, (2) goals, plans, intentions, needs, emotions, and moods of the speaker and characters in the story, (3) situations and scripts, and (4) themes, morals, and the point of the story.

In some cases, the NLP device 524 may perform natural language generation in response to receiving a command. According to some embodiments, the NLP device 524 may perform natural language generation by utilizing one or more of the following AI techniques: content determination, discourse structuring, referring expression generation, lexicalization, linguistic realization, and/or explanation generation.

Content determination may involve deciding what content to present to the user out of all the content that might be relevant. Discourse structuring may involve determining the order and level of detail in which content is expressed. Referring expression generation may involve generating expressions that refer to entities previously mentioned in a dialogue. Lexicalization may involve deciding what words and phrases to use to express a concept. Linguistic realization may involve determining what linguistic structures, such as grammatical constructions, to use to express an idea. Explanation generation may involve generating a humanly-understandable, transparent explanation of a conclusion, chain of reasoning, or result of a machine learning model (e.g., machine learning model 695, as discussed with respect to FIG. 6). In the example embodiment shown in FIG. 6, the NLP device 124 may determine the meaning of the incoming message and convert it to a form that may be processed by the machine learning device 520. Accordingly, the second event generated by the NLP device 524 may represent a determined meaning of the incoming dialogue message and the NLP device 524 may send the second event to the event queue 660.

The machine learning device 520 may receive the second event from the event queue 660 in response to detecting it, as described above with respect to the machine learning device 520 receipt of the first event. In some embodiments, the machine learning device 520 may also update the client context (e.g., client account information) at this point by receiving updated client information from, for example, the database 518. The machine learning device 520 may, in response to processing the second event, generate a second command to be placed in a command queue 670. According to some embodiments, the machine learning device 520 may generate the second command based on the processed event, the user context/order information, and using one or more of a rule-based platform 690 and a trained machine learning model 695 as described above. In the example embodiment shown in FIG. 7, the second event may be a user request to know, for example, a client's credit score as part of approving the client for an automotive loan, a home refinance, a credit card offer, etc. Based on the client context, the rule-based platform 690 and/or trained machine learning model 695, the machine learning device 520 may decide, for example, using predictive analytics, that it has enough information to create a second event that represents instructions to an API associated with the API server 522 to identify a document template associated with approving the loan application requested by the client that may be preemptively filled in lieu of manually being identified and filled by a user of the user device (e.g., user device 502B). However, in some embodiments, the machine learning device 520 may decide that, for example, it requires more information and may instead create a second event that represents instructions to communication interface 701 to send a message to user device 502B requesting more information. Accordingly, based on the client context, the rule-based platform 690, and the trained machine learning model 695, the machine learning device 520 may change or adapt its responses to a given request over time.

The machine learning device 520 may, in response to processing the second event, generate a second command to be placed in command queue 670. According to some embodiments, the machine learning device 520 may generate the second command based on the processed event, the client context, and using one or more of rule-based platform 690 and trained machine learning model 695 in a fashion similar to the generation of the first command described above. According to some embodiments, the second command may represent a command to the API server 622 to identify a document template associated with a client request.

In some embodiments, the API server 622 may receive the second command from the command queue 670, execute the command, and generate a third event to be placed in the event queue 660. According to some embodiments, the API server 622 may continuously or intermittently monitor the command queue 670 to detect new commands and, upon detecting a new command, may receive the command from the command queue 670. Upon receiving a command, the API server 622 may perform various functions depending on the nature of the command. In some cases, the API server 622 may call up an API stored locally or remotely on another device, to retrieve user/order data, perform an account action (e.g., validate a loan application), and/or respond to a client natural language prompt with a natural language response that may include one or more data entries extracted from a document uploaded by a client device (e.g., client device 502A).

The machine learning device 520 may receive the third event from the event queue 660 in response to detecting it as described above. In some embodiments, the machine learning device 520 may also update the client context at this point by receiving updated client information from, for example, the database 518.

The machine learning device 520 may, in response to processing the third event, generate a third command to be placed in the command queue 670. According to some embodiments, the machine learning device 620 may generate the third command based on the processed third event and/or the client context using one or more of the rule-based platform 690 and the trained machine learning model 695 in a fashion like the generation of the first command described above. In some embodiments, the machine learning device 520 may also generate a response message in response to processing an event, such as the third event. In some embodiments, the machine learning device 520 may receive a response message as an event produced by the NLP device 524. According to some embodiments, the third command may represent a command or instruction to the communication interface 701 to transmit the response dialogue message to, for example, the user device 502B.

The communication interface 701 may receive and execute the third command, which may cause the communication interface 701 to transmit (e.g., via SMS and/or voice) the response message to user device 502B. In some embodiments, the communication interface 701 may continuously or intermittently monitor the command queue 670 for new commands and may receive the third command in response to detecting the third command in the command queue 670. According to some embodiments, the communication interface 701 may be a standalone device having some or all of the elements of the machine learning device 520 as shown in FIG. 6. In some embodiments, the communication interface 701 may be integrated into machine learning device 520 (e.g., as I/O device 620). In some embodiments, the communication interface 701 may be integrated into another device, such as, for example, the web server 510, the transaction server 512, the API server 522, and/or the NLP device 524.

As shown in the example embodiments in FIG. 7 and also in FIG. 6, the system 500 may autonomously exchange messages or conduct dialogue with a user utilizing the structure provided by the event queue 660, the machine learning device 520, the command queue 670, the API server 522, the NLP device 524, and the communication interface 701 to identify one or more document templates based on information received from both clients/customers (e.g., via customer device 502A), users/auditors (such as a user or auditor of user device 502B), and information that is looked up by one or more components of system 500 (e.g., looking up client information in, for example, database 518) and to proactively fill the document template with extractable data entries extracted from documents provided to system 500 by a client (e.g., via client device 502A). That is, the system 500 may determine whether each event received by the machine learning device 520 triggers the system 500 to identify a relevant document template, extract and normalize one or more extractable data entries from one or more documents uploaded by a client, and proactively generate and add, one or more entries in place of one or more blank placeholder entries in the identified document template. To accomplish this, the system 500 may iteratively generate confidence intervals associated with potential actions requested by a client. Based on an identified client action request, system 500 may identify a document template associated with the identified action request. In some embodiments, the action request may be provided to the system 500 by the client (e.g., via client device 502A). In some embodiments, the system 500 may use one or more of rule-based platform 690 and the trained machine learning model 695 to infer the action request based on one or more of the documents uploaded by client, one or more natural language prompts received from a user/auditor, and/or one or more data entries associated with a client or customer received or requested from a database (e.g., database 518). The system 500 may undertake one or more investigational strategies, including investigational responses and/or calls to data stores (e.g., database 518) to elicit additional information about the client and/or the client action request. With each additional piece of information received, the system 500 may adjust a confidence measurement for each potential client action request, and when the confidence measurement reaches a predetermined threshold for at least one potential action request, the system 500 may determine identify a document template and fill the document template with one or more data entries based on one or more extractable data entries extracted from one or more documents uploaded by a client. As part of this process, the system 500 may adaptively respond to user messages to leverage AI in the machine learning models and NLP device(s) to adaptively respond to user communications using natural language before and/or after identifying triggers to provide a response. Further, repeatedly updating a client context may enable the system 500 to provide customized responses regarding client action requests over time. Thus, in certain example implementations, by applying AI and/or machine-learning via the NLP device 524, and by repeatedly updating and maintaining the client context (i.e., by the machine learning device 520) the system 500 may proactively identify a document template that may be filled using data based on data entries extracted from one or more documents uploaded by a client. While FIG. 7 and the related description appear to show an example of a single cycle of events, it should be appreciated that multiple different cycles of events (with associated feedback) may be processed in parallel by the machine learning device 520. In some embodiments, the API server 522, the NLP device 524, and the communication interface 701 may operate asynchronously, which may allow their independent operation, for example, by separately pulling commands from command queue 670. Accordingly, the entire system may be stateless with no side effects to calling a particular function. That is, in some embodiments, the system 500 may translate each received event queue in isolation without referencing contextual data from other events in the command queue 670.

Certain example implementations of the disclosed technology may include two types of input: one-sided, non-interactive communication received from a user (such as utterances); and/or interactive, back-and-forth communication (such as a conversation) where a user interacts with the system 500.

Certain example implementations of the disclosed technology may include solution spaces that are (A) constrained, with multiple-choice solutions, (B) constrained, with solutions selectable from the full solution space, and/or (C) unconstrained.

According to certain example implementations of the disclosed technology, the term "dialogue" as used herein may refer to information and/or communication received from a client or customer and/or provided to a user or auditor as part of the interaction(s) between the user/auditor and the system 500. In some implementations, such interactions may utilize certain communication channels (such as voice, e-mail, messaging, etc.) to exchange textual, audible and/or video information. Certain example implementations may utilize user history records and/or records of communications with human agents to provide additional context for the interaction between the user and the dialogue learning module. According to certain example implementations of the disclosed technology, the dialogue may be in the form of interactive (i.e., back-and-forth, two-way, conversation-like) communications between the user and the system 500. In some implementations, the dialogue may be in the form of non-interactive (i.e., single-sided, one-way, story-like) communications. In certain example implementations, records of interactive and/or non-interactive communications conducted with the user may be utilized. In certain implementations, such communication information may be obtained, for example, through a chat window, e-mail, phone call, etc., and/or recorded through textual, audible and/or video information channels.

In accordance with certain example implementations, the systems and methods disclosed herein include virtual assistants that utilize machine learning and/or other types of Artificial Intelligence (A.I.) systems to operate and interact with a user without the need for a human agent. It is frequently impossible for humans to perform the calculations performed by A.I. systems. For example, and as disclosed herein, the processing that the A.I. systems performs is often not pre-programmed and may vary depending on dynamic factors, such as the utterance input received, a time at which the input data set was processed, other input data previously processed, etc. For A.I. systems (such as those disclosed herein) that employ repeated or continuous learning, it may even be impossible to identify the particular algorithm(s) used to process a given input data set. These complexities indicate that A.I. systems are more than just a set of algorithms, but rather frameworks that are carefully designed in terms of input variables, hyperparameters, optimization variables, training data sets, validation data sets, etc. Certain algorithms may support and define a high-level A.I. framework but may or may not be the same algorithms that are used to process input data. In accordance with certain implementations of the disclosed technology, the machine-learning/A.I. framework disclosed herein performs a superior job (compared with a human) of identifying specific data-processing algorithms (e.g., in terms of machine-learning parameters). Thus, the A.I. system discussed herein may not utilize predefined computer algorithms and may extend well beyond mental processes and abstract ideas.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Examples of the present disclosure can be implemented according to at least the following clauses:

Clause 1: A natural language system for proactively extracting data from complex documents, the system comprising: one or more processors; a Natural Language Processing (NLP) device; a trained machine learning device; and a memory in communication with the one or more processors and storing instructions that, when executed by the one or more processors, are configured to cause the system to: receive, from a client device, one or more documents and a first action request; extract one or more extractable data entries from the one or more documents based on the first action request; generate, by the NLP device, one or more normalized data entries based on the one or more extractable data entries; and proactively generate and add, by the trained machine learning device, one or more completed data entries in place of one or more placeholders in a first document template, the one or more completed data entries being generated based on the normalized data entries and the first action request.

Clause 2: The system of clause 1 wherein the instructions are further configured to cause the system to: receive, from a first user device, a first natural language prompt; determine, by the NLP device, a machine-readable semantic representation of the first natural language prompt; and generate a natural language response comprising at least one of the one or more completed data entries.

Clause 3: The system of clause 2, wherein the instructions are further configured to cause the system to: identify one or more of the one or more completed data entries as one or more sensitive data entries; and omit the one or more sensitive data entries from the natural language response.

Clause 4: The system of clause 1, wherein a first user device is associated with a first security tier and a second user device is associated with a second security tier, and the instructions are further configured to cause the system to: identify a first sensitive data entry of the one or more completed data entries, the first sensitive data entry being associated with the first security tier; identify a second sensitive data entry of the one or more completed data entries, the second sensitive data entry being associated with the second security tier; generate a first natural language response comprising the first sensitive data entry and a request to verify the first sensitive data entry; generate a second natural language response comprising the second sensitive data entry and a request to verify the second sensitive data entry; transmit the first natural language response to the first user device associated with the first security tier; and transmit the second natural language response to the second user device associated with the second security tier.

Clause 5: The system of clause 2, wherein the instructions are further configured to cause the system to: receive training feedback from the first user device; and update the trained machine learning device using the training feedback.

Clause 6: The system of clause 5, wherein the training feedback comprises a number of corrected inputs received from the first user device and updating the trained machine learning device further comprises comparing the corrected inputs to the one or more completed data entries.

Clause 7: The system of clause 2, wherein the instructions are further configured to cause the system to: generate a graphical user interface providing a visual representation of the first document template and the one or more completed data entries; and transmit the graphical user interface to the first user device for display.

Clause 8: A natural language system for secure data extraction from source documents, the system comprising: one or more processors; a Natural Language Processing (NLP) device; a trained machine learning device; and a memory in communication with the one or more processors and storing instructions that, when executed by the one or more processors, are configured to cause the system to: receive, from a client device, one or more documents and a first action request; extract one or more extractable data entries from the one or more documents based on the first action request; generate, by the NLP device, one or more normalized data entries based on the one or more extractable data entries; identify, by the trained machine learning device, one or more sensitive data entries within the one or more normalized data entries, each of the one or more sensitive data entries associated with a security tier of a plurality of security tiers; receive, from a first user device, a first natural language prompt and a first security identifier associated with a first security tier of the plurality of security tiers; determine, by the NLP device, a machine-readable semantic representation of the first natural language prompt; provide, to the trained machine learning device, the machine-readable semantic representation of the first natural language prompt; determine, by the trained machine learning device, a response to the machine-readable semantic representation of the first natural language prompt, the response comprising at least one of the one or more normalized data entries and an associated confidence interval for each normalized data entry in the response; alter, by the trained machine learning device, the response by omitting any sensitive data entry not associated with the first security tier; and provide the altered response to the first user device.

Clause 9: The system of clause 8, wherein the instructions are further configured to cause the system to: generate a graphical user interface providing a visual representation of the one or more normalized data entries included in the altered response and the associated confidence interval for each normalized data entry included in the altered response; and transmit the graphical user interface to the first user device for display.

Clause 10: The system of clause 8, wherein the instructions are further configured to cause the system to: receive training feedback from the first user device; and update the trained machine learning device using the training feedback.

Clause 11: The system of clause 8, wherein a second user device is associated with a second security tier, and the instructions are further configured to cause the system to: identify a first sensitive data entry of the one or more normalized data entries, the first sensitive data entry being associated with the first security tier; identify a second sensitive data entry of the one or more normalized data entries, the second sensitive data entry being associated with the second security tier; generate a first natural language response comprising the first sensitive data entry and a request to verify the first sensitive data entry; generate a second natural language response comprising the second sensitive data entry and a request to verify the second sensitive data entry; transmit the first natural language response to the first user device associated with the first security tier; and transmit the second natural language response to the second user device associated with the second security tier.

Clause 12: The system of clause 8, wherein the machine learning device comprises a recurrent neural network (RNN), a convolutional neural network (CNN), a transformer, or a combination thereof.

Clause 13: A natural language system for secure data extraction from source documents, the system comprising: one or more processors; a Natural Language Processing (NLP) device; a trained machine learning device; and a memory in communication with the one or more processors and storing instructions that, when executed by the one or more processors, are configured to cause the system to: receive, from a client device, one or more documents; extract one or more extractable data entries from the one or more documents; generate, by the NLP device, one or more normalized data entries based on the one or more extractable data entries; receive, from a first user device, a first natural language prompt; determine, by the NLP device, a machine-readable semantic representation of the first natural language prompt; proactively determine, by the trained machine learning device, (i) a first document template associated with the one or more normalized data entries and (ii) a first confidence interval based on first natural language prompt; responsive to the first confidence interval exceeding a predetermined threshold, proactively generate and add, by the trained machine learning device, one or more completed data entries in place of one or more placeholders in the first document template, the one or more completed data entries being generated based on the normalized data entries; responsive to the first confidence interval not exceeding the predetermined threshold: generate, by the NLP device, a natural language response comprising a request for a first user associated with the first user device to verify the first document template; and transmit the natural language response to the first user device.

Clause 14: The system of clause 13, wherein responsive to the first confidence interval not exceeding the predetermined threshold, the instructions are further configured to cause the system to: receive, from the first user device, a second natural language prompt; determine, by the NLP device, a machine-readable semantic representation of the second natural language prompt; update the first confidence interval based on the second natural language prompt; determine whether the updated confidence interval exceeds the predetermined threshold; and responsive to the updated first confidence interval exceeding the predetermined threshold, proactively generate and add, by the trained machine learning device, the one or more completed data entries in place of the one or more placeholders in the first document template.

Clause 15: The system of clause 14, wherein the instructions are further configured to cause the system to: generate a graphical user interface providing a visual representation of the first document template and the one or more completed data entries; and transmit the graphical user interface to the first user device for display.

Clause 16: The system of clause 13, wherein the instructions are further configured to cause the system to: identify one or more of the one or more extractable data entries as one or more sensitive data entries; and omit the one or more sensitive data entries from the natural language response.

Clause 17: The system of clause 13, wherein the first user device is associated with a first security tier and a second user device is associated with a second security tier, and the instructions are further configured to cause the system to: identify a first sensitive data entry of the one or more normalized data entries, the first sensitive data entry being associated with the first security tier; identify a second sensitive data entry of the one or more normalized data entries, the second sensitive data entry being associated with the second security tier; generate a first natural language response comprising the first sensitive data entry and a request to verify the first sensitive data entry; generate a second natural language response comprising the second sensitive data entry and a request to verify the second sensitive data entry; transmit the first natural language response to the first user device associated with the first security tier; and transmit the second natural language response to the second user device associated with the second security tier.

Clause 18: The system of clause 13, wherein the instructions are further configured to cause the system to: receive training feedback from the first user device; and update the trained machine learning device using the training feedback.

Clause 19: The system of clause 18, wherein the training feedback comprises a number of corrected inputs received from the first user device and updating the trained machine learning device further comprises comparing the corrected inputs to the one or more completed data entries.

Clause 20: The system of clause 13, wherein the machine learning device comprises a recurrent neural network (RNN), a convolutional neural network (CNN), a transformer, or a combination thereof.

Exemplary Use Cases

A client may wish to receive an approval for a mortgage refinance. The client uploads several documents to a portal through a web server associated with the system. The system receives PDF documents scanned by the client and uploaded to the system. The uploaded documents may include one or more of the previous mortgage agreement, a W2 form, a 1099 form, a pay stub, one or more bank account statements, a 401k account statement, a brokerage statement, etc., a statement of debts, a home appraisal, etc. The system may parse each document and identify extractable data entries using a predefined set of rules, and a trained machine learning model. The system normalizes the extractable data entries, and in some embodiments identifies and tokenizes sensitive data entries. In some embodiments, the client also provides an action request, which may include a request to be approved for a mortgage refinance. In some embodiments, the client may not provide an action request. The system may identify the relevant document template based in part on the action request and on the normalized extractable data entries from the documents uploaded by the client. When a first document template can be identified with a confidence interval exceeding a predetermined threshold, the system proactively generates, and adds the normalized extractable data entries in place of placeholder entries in the identified document template. The system may generate a graphical user interface identifying the document template and its associated confidence interval (with highlights identifying various levels of confidence). Each completed data entry may be accompanied by a highlighted color indicating the confidence interval for the respective completed data entry. According to some embodiments, the user (e.g., via user device) can interact with the results graphically and provide user feedback verifying an accuracy of any of the presented information, including the completed data entries. In some cases, the system may identify and tokenize sensitive data entries to protect the private information of the client. In some cases, when private information needs to be manually confirmed or verified, the system may transmit the sensitive data entry as a tokenized entry only to a user device that has a security tier equivalent to the security tier assigned to the respective sensitive data entry. For example, a social security number may be tokenized or omitted from a customer service representative's user device, but an auditor user device may have the prerequisite security tier (e.g., via a security identifier provided to the system via network 516 and/or network 506) to receive the sensitive data entry and decryption to view the data entry if the sensitive data entry is transmitted as a tokenized data entry.

When no document template can be identified with a confidence interval exceeding the predetermined threshold, the system may generate natural language responses to the user to elicit additional information regarding the client application. In some embodiments, the system includes a request to verify an identified document template within the natural language response. In some embodiments, the system will query one or more databases or servers to identify incomplete or missing data entries associated with the normalized extractable data entries from the one or more documents uploaded by the client. The user device may provide an additional natural language utterance based on the prompt, and the system may upload confidence intervals associated with the relevant document template. Based on one or more of a collaborative natural-language question and answer between the system and a user, verifying missing/incomplete entries by searching databases and servers, etc., the system may identify the relevant document template and proactively fill the document template with the normalized data entries.

What is claimed is:

1. A natural language system for proactively extracting data from complex documents, the system comprising:
   one or more processors;
   a Natural Language Processing (NLP) device;
   a trained machine learning device; and
   a memory in communication with the one or more processors and storing instructions that, when executed by the one or more processors, are configured to cause the system to:
      receive, from a client device, one or more documents and a first action request;
      extract one or more extractable data entries from the one or more documents based on the first action request;
      generate, by the NLP device, one or more normalized data entries based on the one or more extractable data entries by placing the one or more extractable data entries into one or more standardized formats;
      identify, by the trained machine learning device, a first security tier associated with the one or more normalized data entries;
      receive, from a first user device, a first request and a first security identifier associated with the first security tier;
      determine, by the trained machine learning device, a response to the first request;
      alter, by the trained machine learning device, the response by omitting one or more sensitive data entries within the one or more normalized data entries based on the first security identifier; and
      provide the altered response to the first user device by proactively generating and adding, by the trained machine learning device, one or more completed data entries in place of one or more placeholders in a first document template, the one or more completed data entries being generated based on the one or more normalized data entries, the one or more omitted sensitive data entries, and the first action request.

2. The system of claim 1, wherein the first user device is associated with the first security tier and a second user device is associated with a second security tier, and the instructions are further configured to cause the system to:
   identify a first sensitive data entry of the one or more completed data entries, the first sensitive data entry being associated with the first security tier;
   identify a second sensitive data entry of the one or more completed data entries, the second sensitive data entry being associated with the second security tier;
   generate a first natural language response comprising the first sensitive data entry and a request to verify the first sensitive data entry;
   generate a second natural language response comprising the second sensitive data entry and a request to verify the second sensitive data entry;
   transmit the first natural language response to the first user device associated with the first security tier; and
   transmit the second natural language response to the second user device associated with the second security tier.

3. The system of claim 1, wherein the instructions are further configured to cause the system to:
   receive training feedback from the first user device; and
   update the trained machine learning device using the training feedback.

4. The system of claim 3, wherein the training feedback comprises a number of corrected inputs received from the first user device and updating the trained machine learning device further comprises comparing the corrected inputs to the one or more completed data entries.

5. The system of claim 1, wherein the instructions are further configured to cause the system to:
generate a graphical user interface providing a visual representation of the first document template and the one or more completed data entries; and
transmit the graphical user interface to the first user device for display.

6. The system of claim 1, wherein the instructions are further configured to cause the system to:
identify the first document template based on the first action request and the one or more normalized data entries; and
identify a confidence interval associated with the first document template;
wherein proactively generate and add one or more completed data entries in place of one or more placeholders in the first document template is performed in response to determining the confidence interval exceeds a predetermined threshold.

7. The system of claim 6, wherein the instructions are further configured to cause the system to:
responsive to determining the confidence interval does not exceed the predetermined threshold, generate, by the NLP device, an NLP response comprising a request for a user to verify the first document template.

8. A natural language system for secure data extraction from source documents, the system comprising:
one or more processors;
a Natural Language Processing (NLP) device;
a trained machine learning device; and
a memory in communication with the one or more processors and storing instructions that, when executed by the one or more processors, are configured to cause the system to:
receive, from a client device, one or more documents and a first action request;
extract one or more extractable data entries from the one or more documents based on the first action request;
generate, by the NLP device, one or more normalized data entries based on the one or more extractable data entries;
identify, by the trained machine learning device, one or more sensitive data entries within the one or more normalized data entries, each of the one or more sensitive data entries associated with a security tier of a plurality of security tiers;
receive, from a first user device, a first natural language prompt and a first security identifier associated with a first security tier of the plurality of security tiers;
determine, by the NLP device, a machine-readable semantic representation of the first natural language prompt;
provide, to the trained machine learning device, the machine-readable semantic representation of the first natural language prompt;
determine, by the trained machine learning device, a response to the machine-readable semantic representation of the first natural language prompt, the response comprising at least one of the one or more normalized data entries and an associated confidence interval for each normalized data entry in the response;
alter, by the trained machine learning device, the response by omitting any sensitive data entry not associated with the first security tier; and
provide the altered response to the first user device.

9. The system of claim 8, wherein the instructions are further configured to cause the system to:
generate a graphical user interface providing a visual representation of the one or more normalized data entries included in the altered response and the associated confidence interval for each normalized data entry included in the altered response; and
transmit the graphical user interface to the first user device for display.

10. The system of claim 8, wherein the instructions are further configured to cause the system to:
receive training feedback from the first user device; and
update the trained machine learning device using the training feedback.

11. The system of claim 8, wherein a second user device is associated with a second security tier, and the instructions are further configured to cause the system to:
identify a first sensitive data entry of the one or more normalized data entries, the first sensitive data entry being associated with the first security tier;
identify a second sensitive data entry of the one or more normalized data entries, the second sensitive data entry being associated with the second security tier;
generate a first natural language response comprising the first sensitive data entry and a request to verify the first sensitive data entry;
generate a second natural language response comprising the second sensitive data entry and a request to verify the second sensitive data entry;
transmit the first natural language response to the first user device associated with the first security tier; and
transmit the second natural language response to the second user device associated with the second security tier.

12. The system of claim 8, wherein the machine learning device comprises a recurrent neural network (RNN), a convolutional neural network (CNN), a transformer, or a combination thereof.

13. A natural language system for secure data extraction from source documents, the system comprising:
one or more processors;
a Natural Language Processing (NLP) device;
a trained machine learning device; and
a memory in communication with the one or more processors and storing instructions that, when executed by the one or more processors, are configured to cause the system to:
receive, from a client device, one or more documents;
extract one or more extractable data entries from the one or more documents;
generate, by the NLP device, one or more normalized data entries based on the one or more extractable data entries;
receive, from a first user device, a first natural language prompt;
determine, by the NLP device, a machine-readable semantic representation of the first natural language prompt;
proactively determine, by the trained machine learning device, (i) a first document template associated with the one or more normalized data entries and (ii) a first confidence interval based on first natural language prompt;

responsive to the first confidence interval exceeding a predetermined threshold, proactively generate and add, by the trained machine learning device, one or more completed data entries in place of one or more placeholders in the first document template, the one or more completed data entries being generated based on the one or more normalized data entries;

responsive to the first confidence interval not exceeding the predetermined threshold:
  generate, by the NLP device, a natural language response comprising a request for a first user associated with the first user device to verify the first document template; and
  transmit the natural language response to the first user device.

14. The system of claim 13, wherein responsive to the first confidence interval not exceeding the predetermined threshold, the instructions are further configured to cause the system to:
  receive, from the first user device, a second natural language prompt;
  determine, by the NLP device, a machine-readable semantic representation of the second natural language prompt;
  update the first confidence interval based on the second natural language prompt;
  determine whether the updated first confidence interval exceeds the predetermined threshold; and
  responsive to the updated first confidence interval exceeding the predetermined threshold, proactively generate and add, by the trained machine learning device, the one or more completed data entries in place of the one or more placeholders in the first document template.

15. The system of claim 14, wherein the instructions are further configured to cause the system to:
  generate a graphical user interface providing a visual representation of the first document template and the one or more completed data entries; and
  transmit the graphical user interface to the first user device for display.

16. The system of claim 13, wherein the instructions are further configured to cause the system to:
  identify one or more of the one or more extractable data entries as one or more sensitive data entries; and
  omit the one or more sensitive data entries from the natural language response.

17. The system of claim 13, wherein the first user device is associated with a first security tier and a second user device is associated with a second security tier, and the instructions are further configured to cause the system to:
  identify a first sensitive data entry of the one or more normalized data entries, the first sensitive data entry being associated with the first security tier;
  identify a second sensitive data entry of the one or more normalized data entries, the second sensitive data entry being associated with the second security tier;
  generate a first natural language response comprising the first sensitive data entry and a request to verify the first sensitive data entry;
  generate a second natural language response comprising the second sensitive data entry and a request to verify the second sensitive data entry;
  transmit the first natural language response to the first user device associated with the first security tier; and
  transmit the second natural language response to the second user device associated with the second security tier.

18. The system of claim 13, wherein the instructions are further configured to cause the system to:
  receive training feedback from the first user device; and
  update the trained machine learning device using the training feedback.

* * * * *